(12) United States Patent
Gochi

(10) Patent No.: US 6,549,469 B2
(45) Date of Patent: Apr. 15, 2003

(54) SEMICONDUCTOR MEMORY SYSTEM

(75) Inventor: Hidenobu Gochi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/138,267

(22) Filed: May 6, 2002

(65) Prior Publication Data

US 2003/0012055 A1 Jan. 16, 2003

(30) Foreign Application Priority Data

Jul. 11, 2001 (JP) .................................. 2001-341539

(51) Int. Cl.[7] .............................................. G11C 16/04
(52) U.S. Cl. ............................ 365/189.01; 365/189.04
(58) Field of Search ........................ 365/189.01, 189.04, 365/189.08, 220, 233, 189.12, 230.01

(56) References Cited

U.S. PATENT DOCUMENTS 5,844,843 A * 12/1998 Matsubara et al. ..... 365/185.24
6,034,897 A * 3/2000 Estakhri et al. ........ 365/185.29
6,088,743 A * 7/2000 Takeda .................... 710/35

* cited by examiner

*Primary Examiner*—Richard Elms
*Assistant Examiner*—Anh Phung
(74) *Attorney, Agent, or Firm*—McDermott, Will & Emery

(57) ABSTRACT

The semiconductor memory system includes a first semiconductor memory device, a second semiconductor memory device and a controller. The first memory device is arranged so that data reading and writing at high speeds is performed through the interface of the buses connected to the address inputs and the data I/O ports. The second memory device is arranged so that data reading and writing is controlled by commands provided via the data I/O ports. The controller is arranged responsive to commands from a CPU for controlling the read and write operation of each of the memory devices. In this system, a single write operation of the CPU to the controller can simultaneously write the same data into the memory devices. Accordingly, the time required for data reading and writing on a plurality of memory devices can be minimized, and thus the efficiency of its overall operation can be increased.

10 Claims, 22 Drawing Sheets

Fig.21

| |
|---|
| BIT 0=UPDATING FLAG FOR FIRST SEGMENT |
| BIT 1=UPDATING FLAG FOR SECOND SEGMENT |
| BIT 2=UPDATING FLAG FOR THIRD SEGMENT |
| BIT 3=UPDATING FLAG FOR FOURTH SEGMENT |
| BIT 4=UPDATING FLAG FOR FIFTH SEGMENT |
| BIT 5=UPDATING FLAG FOR SIXTH SEGMENT |
| BIT 6=UPDATING FLAG FOR SEVENTH SEGMENT |
| BIT 7=UPDATING FLAG FOR EIGHTH SEGMENT |
| BIT 8=UPDATING FLAG FOR NINTH SEGMENT |
| BIT 9=UPDATING FLAG FOR TENTH SEGMENT |
| BIT 10=UPDATING FLAG FOR ELEVENTH SEGMENT |
| BIT 11=Reserved |
| BIT 12=Reserved |
| BIT 13=Reserved |
| BIT 14=Reserved |
| BIT 15=Reserved |

UPDATING FLAG REGISTER
(ZZZZZZ+20)h

SEMICONDUCTOR MEMORY SYSTEM

BACKGROUND OF THE INVENTION

1. Field of the Invention

The present invention relates to a semiconductor memory system having a plurality of semiconductor memory devices and a controller for controlling the read and write operation of each semiconductor memory device which are built in.

2. Description of the Related Art

Referring to FIG. 22, one example for a conventional semiconductor memory system will be explained. FIG. 22 is a block diagram schematically showing an arrangement of the conventional semiconductor memory system having a plurality of semiconductor memory devices of which the data read and write operations are controlled by an external CPU. The semiconductor memory system denoted by 90 includes a couple of first and second semiconductor memory devices 91 and 92 which are different from each other in the way for controlling the data read and write operations. The data read and write operations of the semiconductor memory devices 91 and 92 are controlled using commands from an external CPU 99.

The first semiconductor memory device 91 has a chip select signal input "/S", an output enable signal input "/OE", a write enable signal input "/W", address inputs "A0~Am", and data I/O ports "DQ1~DQ16", as the interface ports for CPU 99. Data reading and writing at high speeds on the first semiconductor memory device 91 is performed using a memory bus between the first semiconductor memory device 91 and the CPU 99.

The second semiconductor memory device 92 has a chip select signal input "CE#", an output enable signal input "OE#", a write enable signal input "WE#", a reset/power down signal input "RP#", a write protect signal input "WP#", address inputs "A0~An", and data I/O ports "DQ0~DQ15", as the interface ports for the CPU 99. Data reading and writing on the second semiconductor memory device 92 is performed by transmitting commands from the address inputs or the data I/O ports.

The CPU 99 has as the interface ports for the memory devices 91 and 92 a chip select signal output "/CSm" which is connected via a control bus 96 to the "/S" port of the first memory device 91, a chip select signal output "/CSn" which is connected via a control bus 93a to the "CE#" port of the second memory device 92, a read signal output "/RD" which is connected via a control bus 93b to the "/OE" port of the first memory device 91 and the "OE#" port of the second memory device 92, a write signal output "/WR" which is connected via a control bus 93c to the "/W" port of the first memory device 91 and the "WE#" port of the second memory device 92, an I/O port "I/O Port1" which is connected via a control bus 93d to the "RP#" port of the second memory device 92, an I/O port "I/O Port2" which is connected via a control bus 93e to the "WP#" port of the second memory device 92, address outputs "MA0~MAx" which are connected via an address bus 94 to the corresponding "A0~Am" of the first memory device 91 and the "A0~An" of the second memory device 92, and data I/O ports "D0~D15" which are connected via an data bus 95 to the "DQ1~DQ16" ports of the first device 91 and the "DQ0~DQ15" of the second memory device 92.

The data read/write operation of the semiconductor memory system will now be explained. The CPU 99 selects either its "/CSm" or "/CSn" port for accessing the first memory device 91 or the second memory device 92. For accessing the first memory device 91, the CPU 99 turns its "/CSm" port to L level and selects one of the "A0~Am" port via the address bus 95. When the "/RD" port is turned to L level, the CPU 99 can read data from the first memory device 91. On the other hand, when selecting one of the "DQ1~DQ16" ports via the data bus 95 and turning the "/WR" port to L level, the CPU 99 can write data onto the first memory device 91.

For accessing the second memory device 92, the CPU 99 drives its two ports "I/O Port 1" and "I/O Port 2" port to turn both the "RP#" and "WP#" ports of the memory device 92 to H level. When the "/CSn" port is turned to L level, the second memory device 92 can be accessed. Then, the CPU 99 releases a read command to the data bus 95 and turns its "/WR" port to L level. At the succeeding cycle, when the "/RD" port is turned to L level with the address bus 94 enabled, the data reading from the second memory device 92 can be carried out. Similarly, the CPU 99 releases a program command to the data bus 95 and turns its "/WR" port to L level. At the succeeding cycle, when the "/WR" port is turned to L level with the address bus 94 and data bus 95 enabled, the data writing onto the second memory device 92 can be carried out.

It is however necessary in the conventional system to write data at two different cycles into the two semiconductor memory devices which are different from each other in the way for controlling the data read/write operation. As the data writing data into each semiconductor memory device is separately carried out, the overall processing operation will be elongated.

SUMMARY OF THE INVENTION

It is an object of the present invention to provide substantially a semiconductor memory system having a plurality of semiconductor memory devices of which the read and write operations can be controlled by commands received from an external CPU, which can minimize the length of time required for reading and writing data on two or more semiconductor memory devices thus increasing the efficiency of data processing.

A semiconductor memory system in one aspect of the present invention includes a first semiconductor memory device, a second semiconductor memory device and a controller.

The first semiconductor memory device has a chip select signal input, an output enable signal input, a write enable signal input, address inputs and data I/O ports, and is arranged so that data reading and writing at high speeds is performed through the interface of the buses connected to the address inputs and the data I/O ports. The second semiconductor memory device has a chip select signal input, an output enable signal input, a write enable signal input, address inputs and data I/O ports, and is arranged so that data reading and writing is controlled by commands provided via the data I/O ports. The controller is arranged responsive to commands from the CPU for controlling the read and write operation of each of the semiconductor memory devices.

In this aspect of the semiconductor memory system, a single write operation of the CPU to the controller can simultaneously write the same data into the semiconductor memory devices. Accordingly, the data writing of the semiconductor memory system can be improved in the efficiency as its consuming time is minimized.

BRIEF DESCRIPTION OF THE DRAWINGS

Other objects, advantages, and capabilities of the present invention will become more apparent as the description proceeds taken in conjunction with the accompanying drawings which:

FIG. 21 is a diagram of an updating flag register for the segments of the memory area.

DETAILED DESCRIPTION OF THE PREFERRED EMBODIMENTS

This invention will be described in further detail by way of example with reference to the accompanying drawings.

First Embodiment

Figure 1:
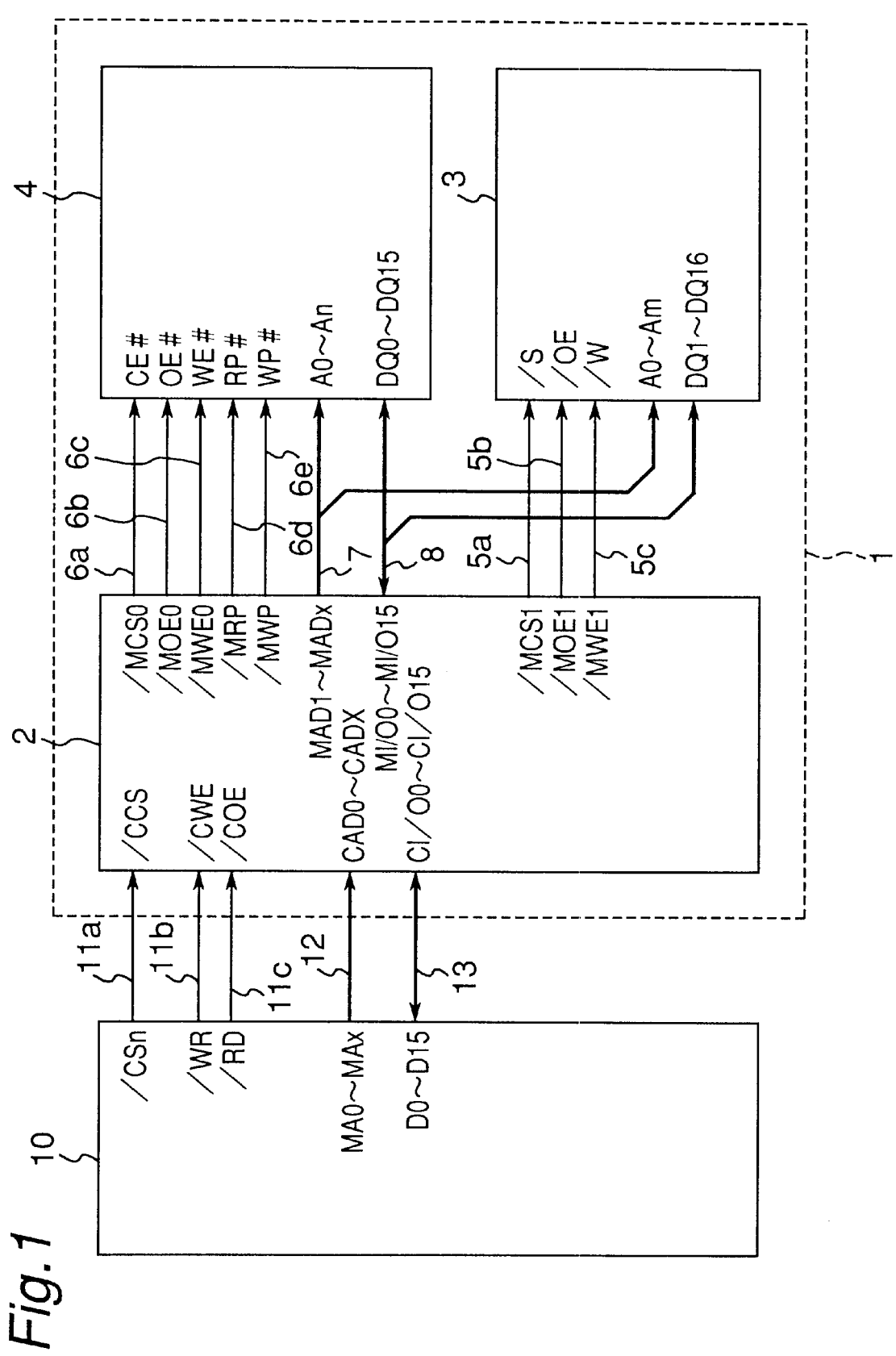
FIG. 1 is a block diagram illustrating the first embodiment of a semiconductor memory system connected with a CPU according to the present invention.

FIG. 1 illustrates the first embodiment of a semiconductor memory system connected with a CPU according to the present invention. The semiconductor memory system denoted by 1 has two, first and second, semiconductor memory devices 3 and 4 which are controlled by commands from an external CPU 10 for data reading and writing. The semiconductor memory system 1 also has a controller 2 connected between the external CPU 10 and the semiconductor memory devices (that is, the first and second semiconductor memory devices 3, 4). The controller 2 is responsive to commands from the CPU 10 for controlling the operation of the semiconductor memory devices 3 and 4.

The first semiconductor memory device 3 has as the interface ports for the controller 2 a chip select signal input "/S", an output enable signal input "/OE", a write enable signal input "/W", address inputs "A0~Am", and data I/O ports "DQ1~DQ16". The data reading and writing on the first semiconductor device 3 is performed through the interface of the buses connected to the address input ports and data I/O ports.

The second semiconductor memory device 4 has as the interface ports for the controller 2 a chip select signal input "CE#", an output enable signal input "OE#", a write enable signal input "WE#", a reset/power down signal input "RP#", a write protect signal input "WP#", address inputs "A0~An", and data I/O ports "DQ0~DQ15". The data reading and writing on the second semiconductor memory device 4 is controlled by commands provided via the data I/O ports.

The controller 2 has as the interface ports for the first semiconductor memory device 3 a chip select signal output "/MCS1" which is connected via a control bus 5a to the "/S" port, an output enable signal output "/MOE1" which is connected via a control bus 5b to the "/OE" port, and a write enable signal output "/MWE1" which is connected via a control bus 5c to the "/W" port of the first semiconductor memory device 3.

Also, the controller 2 has as the interface ports for the second semiconductor memory device 4 a chip select signal output "/MCS0" which is connected via a control bus 6a to the "CE#" port, an output enable signal output "/MOE0" which is connected via a control bus 6b to the "OE#" port, a write enable signal output "/MWE0" which is connected via a control bus 6c to the "WE#" port, a reset/power down signal output "/MRP" which is connected via a control bus 6d to the "RP#" port, and a write protect signal output "/MWP" which is connected via a control bus 6e to the "WP#" of the second semiconductor memory device 4.

Moreover, the controller 2 has the common interface ports for the first semiconductor memory device 3 and the second semiconductor memory device 4 address outputs "MAD1~MADx" which are connected via an address bus 7 to the "A0~Am" ports of the first semiconductor memory device 3 and the "A0~An" of the second semiconductor memory device 4, and data I/O ports "MI/O0~MI/O15" which are connected via a data bus 8 to the "DQ1~DQ16" of the first semiconductor memory device 3 and the "DQ0~DQ15" ports of the second semiconductor memory device 4.

Finally, the controller 2 has as the interface ports for the external CPU 10 a chip select signal input "/CCS", a write enable signal input "/CWE", an output enable signal input "/COE", address inputs "CAD0~CADx", and data I/O ports "CI/O0~CI/O15".

The CPU 10 has as the interface ports for the controller 2 a chip select signal output "CSn" which is connected via a control bus 11a to the "/CCS" port, a write signal output "/WR" which is connected via a control bus 11b to the "/CWE" port, a read signal output "/RD" which is connected via a control bus 11c to the "/COE", address outputs "MA0~MAx" which are connected via an address bus 12 to the "CAD0~CADx" ports, and data I/O ports "D0~D15" which are connected via a data bus 13 to the "CI/O0~CI/O15" ports.

Figure 2:
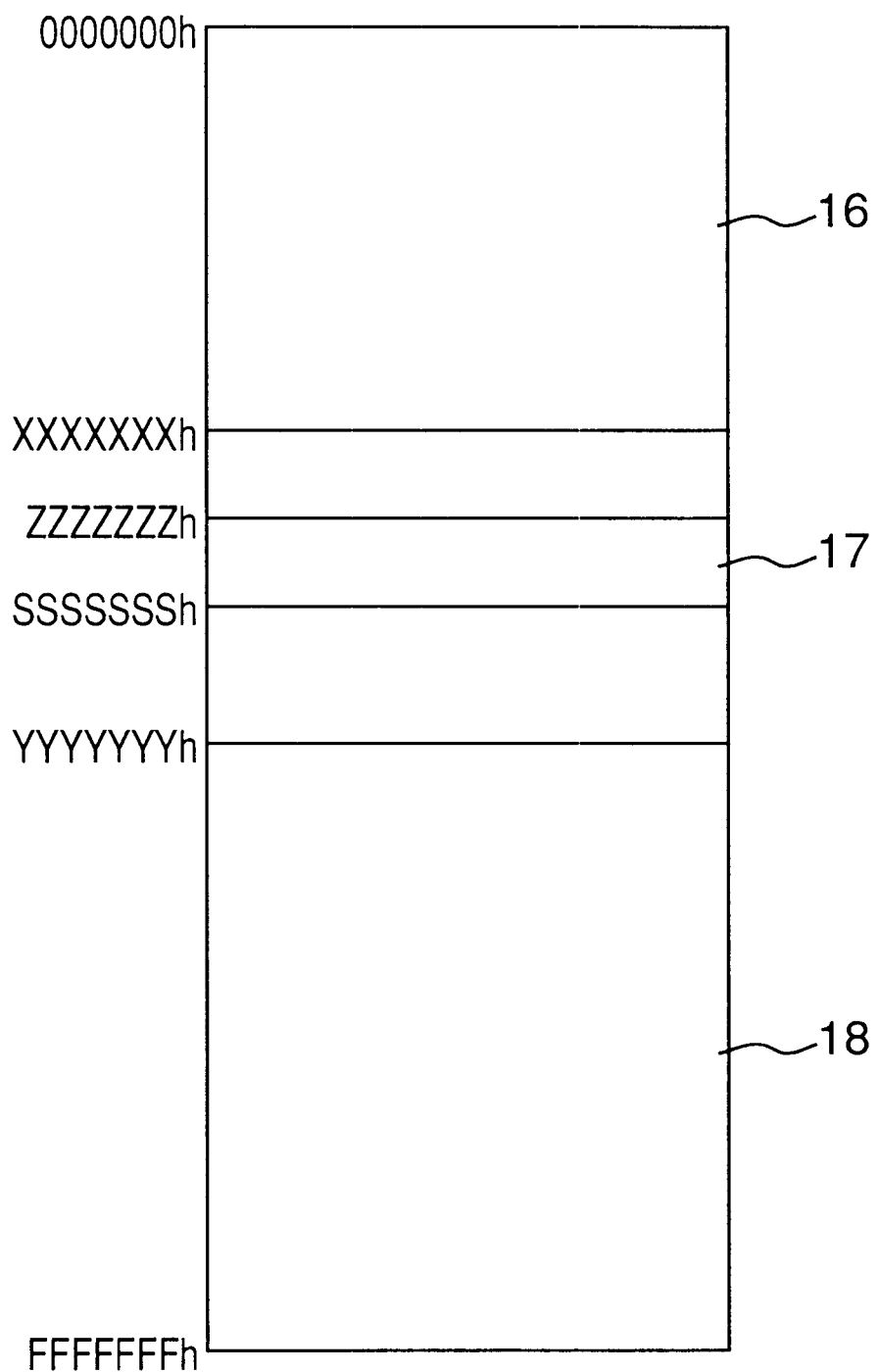
FIG. 2 is a schematic diagram showing memory areas in the semiconductor memory system.

FIG. 2 is a diagram schematically showing memory areas in the semiconductor memory system 1. Although not shown, the controller 2 includes control registers acting as high-speed memories for carrying out a variety of arithmetic operations. As apparent from FIG. 2, the memory area in the semiconductor memory system 1 consists mainly of an area 16 for the first semiconductor memory device 3 (0000000h to XXXXXXXh), an area 17 for the control registers in the controller 2 (ZZZZZZZh to SSSSSSSh), and an area 18 for the second semiconductor memory device 4 (YYYYYYYh to FFFFFFFh).

Figure 3:
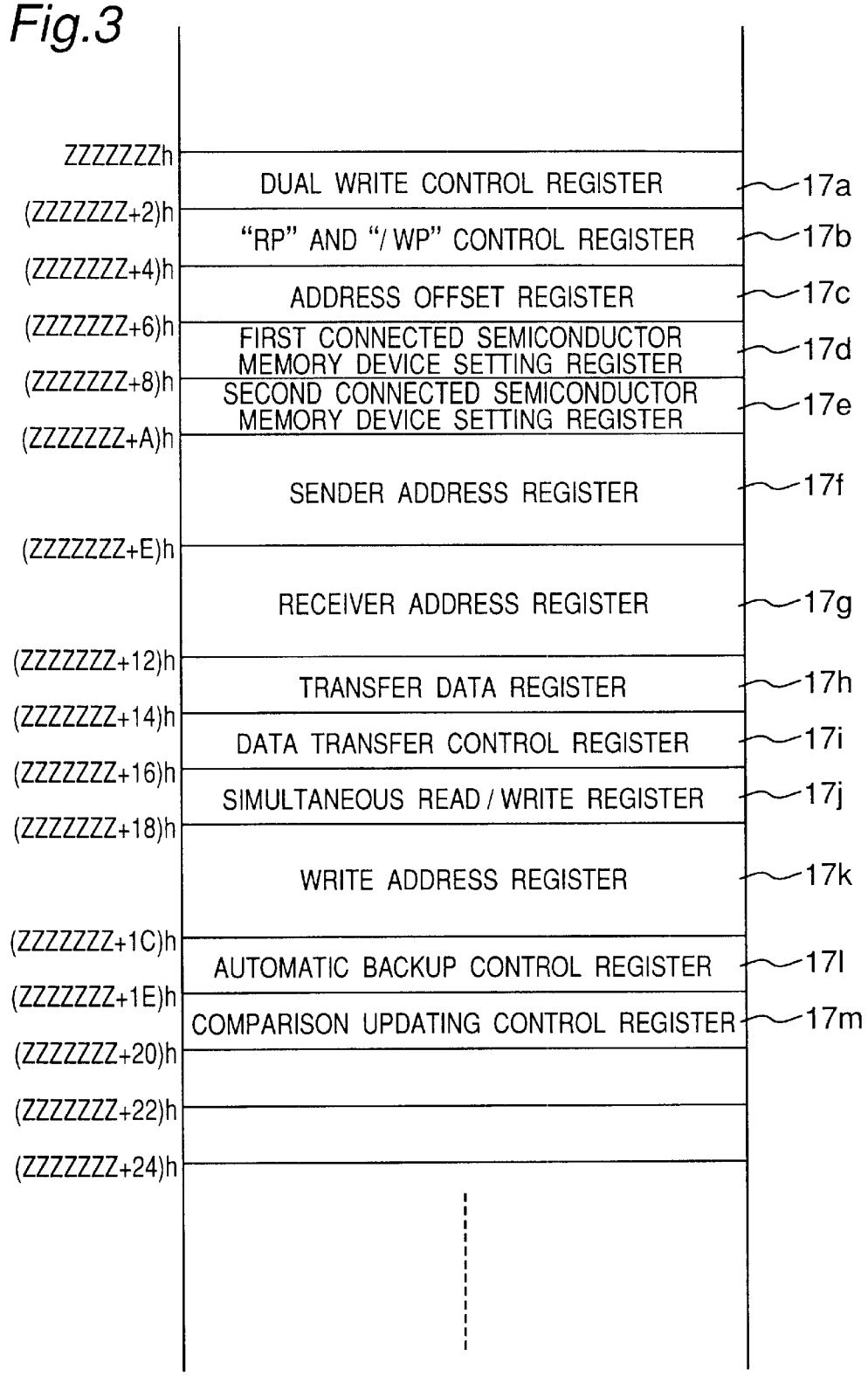
FIG. 3 is a schematic diagram of control registers in the controller showing a part of the memory areas in the semiconductor memory system.

FIG. 3 illustrates the area 17 for the control registers in the controller 2. The area 17 comprises a group of registers for carrying a variety of arithmetic operations including a dual write control register 17a, a "/RP" and "/WP" control register 17b, an address offset register 17c, a first connected semiconductor memory device setting register 17d, a second connected semiconductor memory device setting register 17e, a sender address register 17f, a receiver address register 17g, a transfer data register 17h, a data transfer control register 17i, a simultaneous read/write control register 17j, a write address register 17k, an automatic backup control register 17l, and a comparison update control register 17m.

Figure 4:
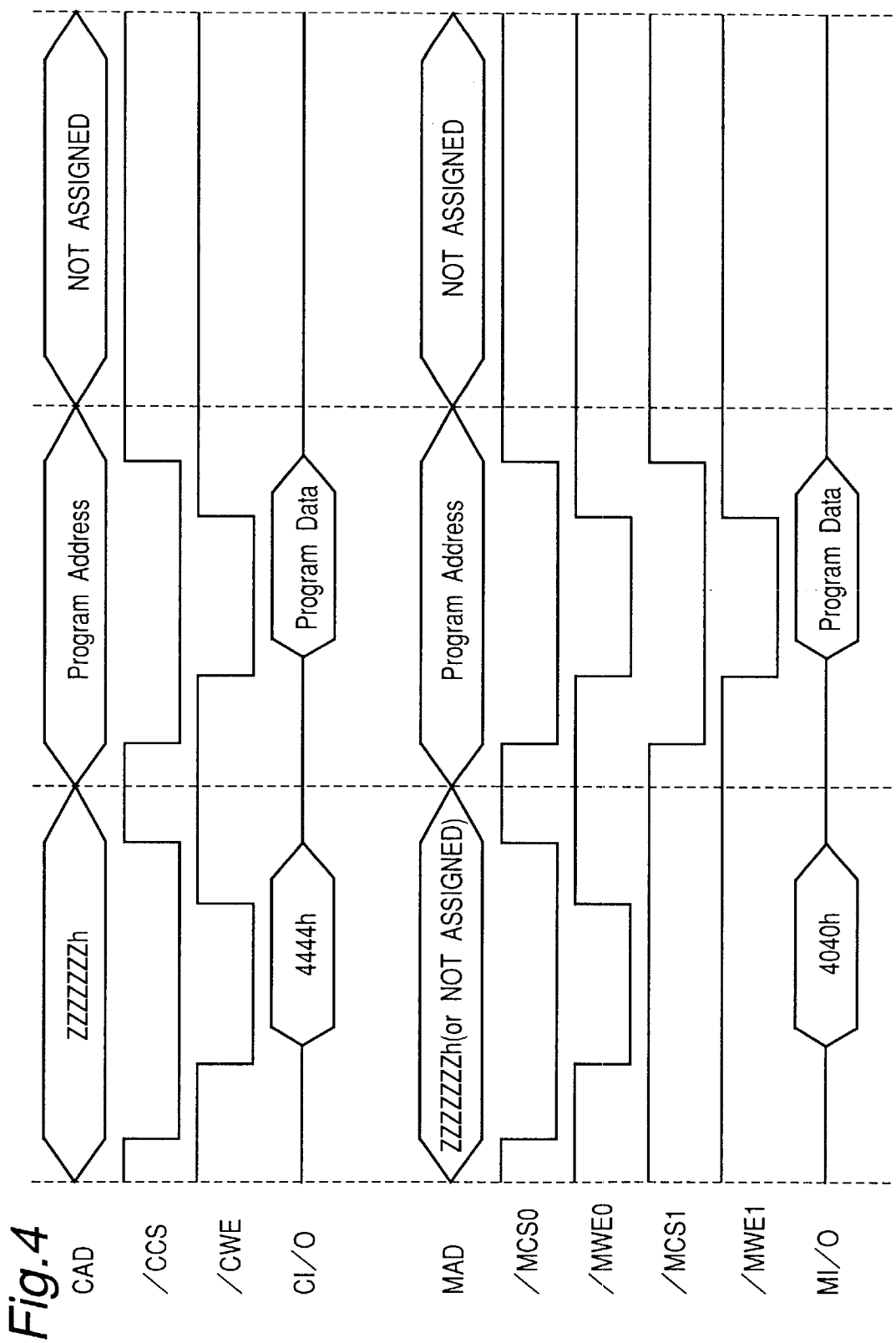
FIG. 4 is a waveform diagram showing the waveform of input and output signals of the controller.

FIG. 4 illustrates the waveform of input and output signals in the controller 2. Using the input and output signals shown, a single write operation can execute the data writing into the same address of the first and second semiconductor memory devices 3 and 4 at once. The write operation using the waveform of input and output signals shown is now explained.

The operation starts with assigning each of bits of the "/RP" and "/WP" control register 17b in the controller 2 to "1" while shifting the reset/power down signal output "/MRP" and the write protect signal output "/MWP" to H level. Then, a dual write command "4444h" is received via the data bus 13 from the CPU 10 and saved in the dual write control register 17a in the controller 2. In response, the controller 2 writes a program command "4040h" into the second semiconductor memory device 4.

This is followed by the CPU 10 loading the address outputs "MAD1~MADx" of the controller 2 with write addresses and the data I/O ports "MI/O0~MI/O15" with write data. As a result, the two semiconductor memory devices 3 and 4 are enabled to save the same data at their addresses determined by the CPU 10.

As understood, the same data can be written by a single write operation into the two semiconductor memory devices 3 and 4 which are different in the way for data reading and writing. Accordingly, the CPU 10 can be minimized in the consumption of time for the write operation with no need of writing data into the two semiconductor memory devices 3 and 4 separately and its utility can thus be improved.

Another embodiment of the present invention will now be described. In the description, like components are denoted by like numerals as those of the first embodiment and will be explained in no more detail.

Second Embodiment

Figure 5:
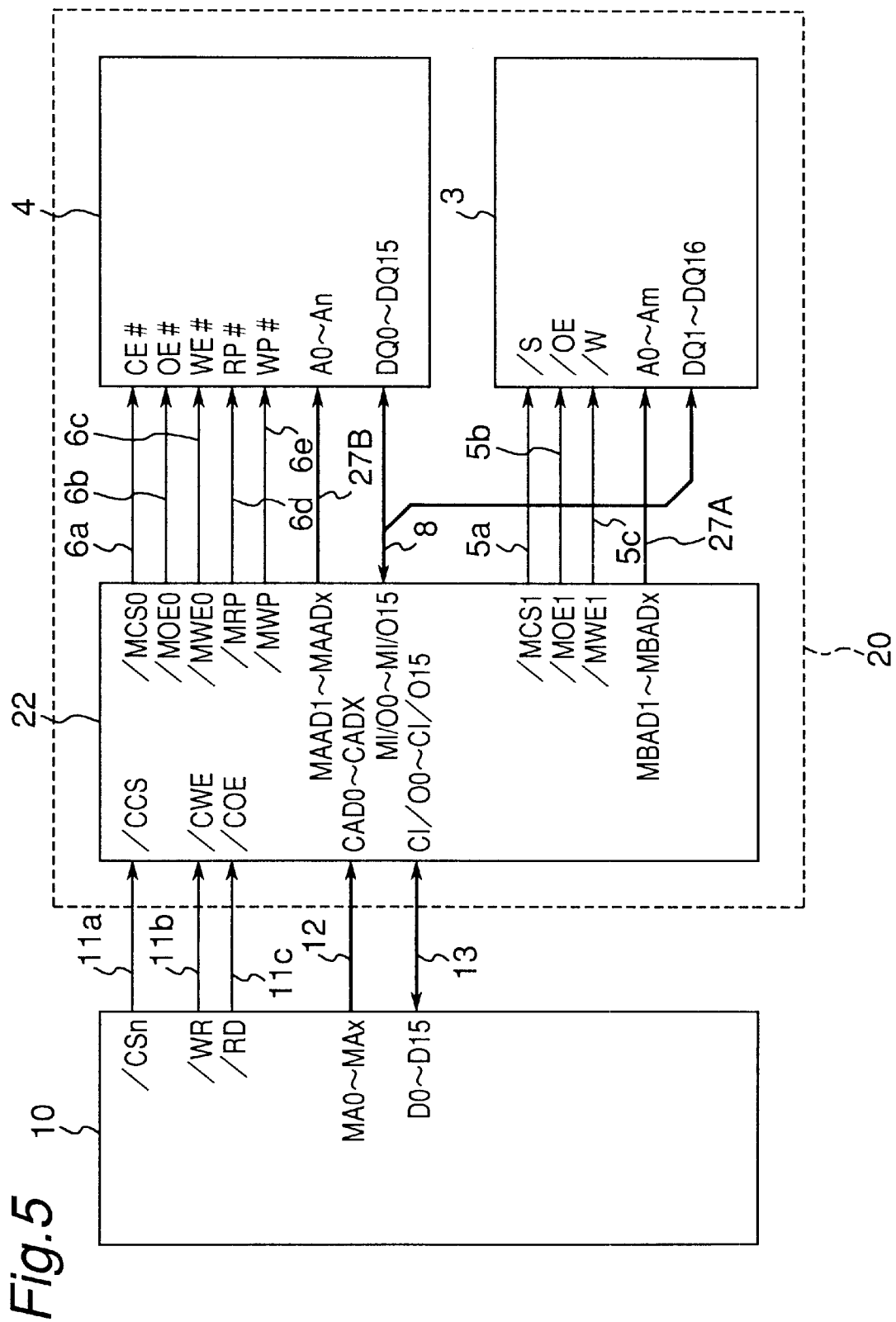
FIG. 5 is a block diagram illustrating the second embodiment of a semiconductor memory system connected with a CPU according to the present invention.

FIG. 5 illustrates the second embodiment of a semiconductor memory system connected with a CPU according to the present invention. The semiconductor memory system denoted by 20 is substantially identical in the construction to that of the first embodiment. Particularly, a controller 22 in the second embodiment has a group of address outputs "MAAD1~MAADx" which are connected via an address bus 27B to corresponding address inputs "A0~An" of a second semiconductor memory device 4 and another group of address outputs "MBAD1~MBADx" which are connected via an address bus 27A to corresponding address inputs "A0~Am" of a first semiconductor memory device 3.

Figure 6:
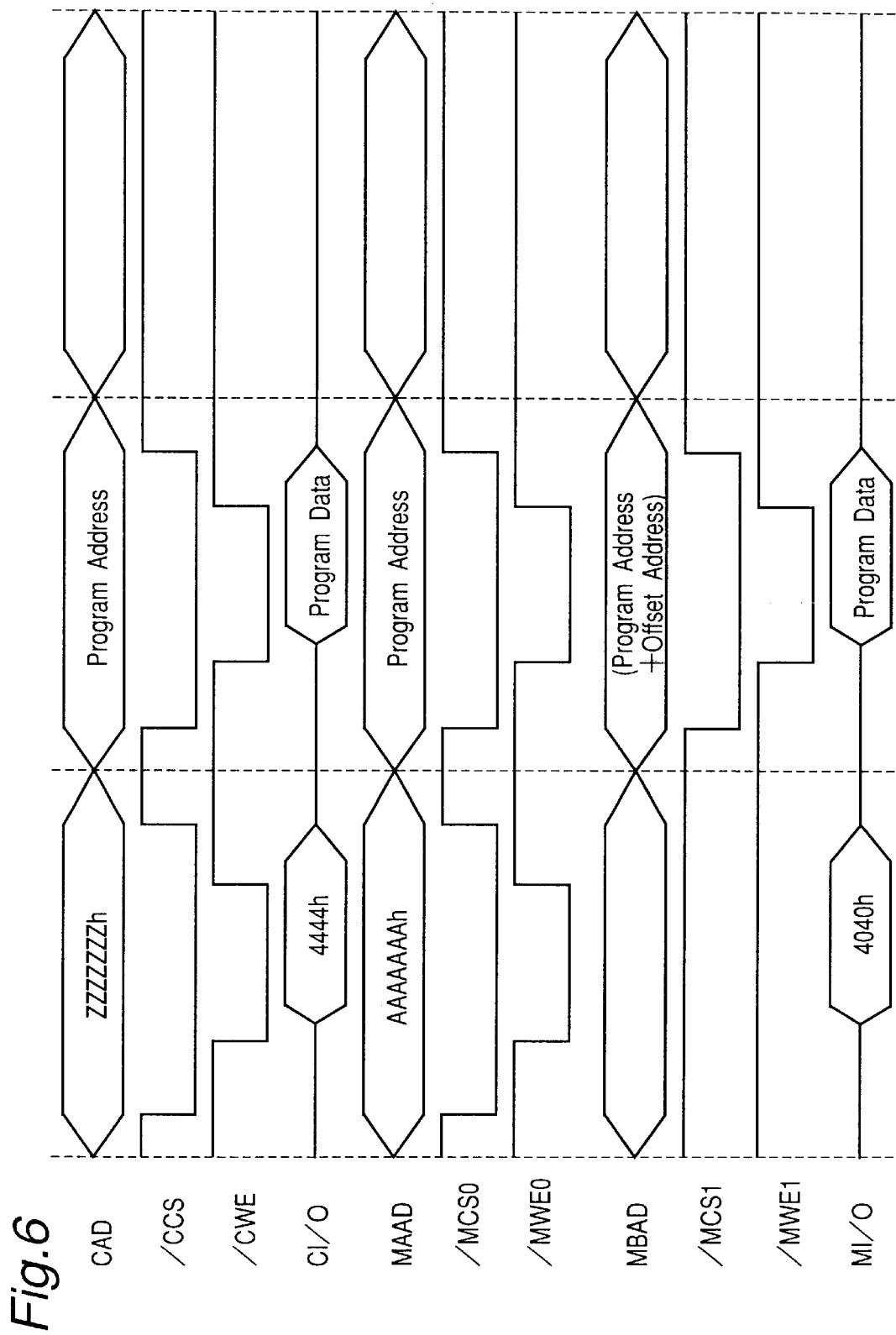
FIG. 6 is a waveform diagram showing the waveform of input and output signals of the controller in the second embodiment of a semiconductor memory system.

FIG. 6 illustrates the waveform of input and output signals in the controller 22. Using the input and output signals shown, a single write operation can execute the data writing into different addresses of the first and second semiconductor memory devices 3 and 4 at once. The write operation using the waveform of input and output signals shown is now explained. The controller 22 like the controller 2 of the first embodiment includes control registers acting as high-speed memories for carrying out a variety of arithmetic operations. The controller 22 has an area 17 similar to the register area of the controller 2 shown in FIG. 3. In the second embodiment, the write operation uses an address offset register 17c, which incorporates a set of control registers shown in FIG. 3, in addition to a dual write control register 17a.

The operation starts with assigning each of bits of the "/RP" and "/WP" control register 17b in the controller 22 to "1" while shifting the reset/power down signal output "/MRP" and the write protect signal output "/MWP" to H level. Then, an address to be written into the second semiconductor memory device 4 is received in the form of an offset address from the address written into the first semiconductor memory device 3. More specifically, the address to be written into the second semiconductor memory device 4 is a combination of the offset address and the write address from the CPU 10.

Succeedingly, a dual write command "4444h" from the CPU 10 is saved in the dual write control register 17a. In response, the controller 22 writes a program command "4040h" into the first semiconductor memory device 3.

This is followed by the CPU 10 loading the address outputs "MAAD1~MAADx" and "MBAD1~MBADx" of the controller 22 with write addresses and the data I/O ports "MI/O0~MI/O15" with write data. As a result, the second semiconductor memory device 4 is set with the write address determined by the CPU 10 and the first semiconductor memory device 3 is set with a combination of the offset address and the write address from the CPU 10. Accordingly, the two semiconductor memory devices 3 and 4 are enabled to save the same data determined by the CPU 10.

As explained, the same data can be written by a single write operation into different addresses in the two semiconductor memory devices 3 and 4 which are different in the way for data reading and writing. Accordingly, the CPU 10 can be minimized in the consumption of time for the write operation with no need of writing data into the two semiconductor memory devices 3 and 4 separately and its utility can thus be improved.

Third Embodiment

Figure 7:
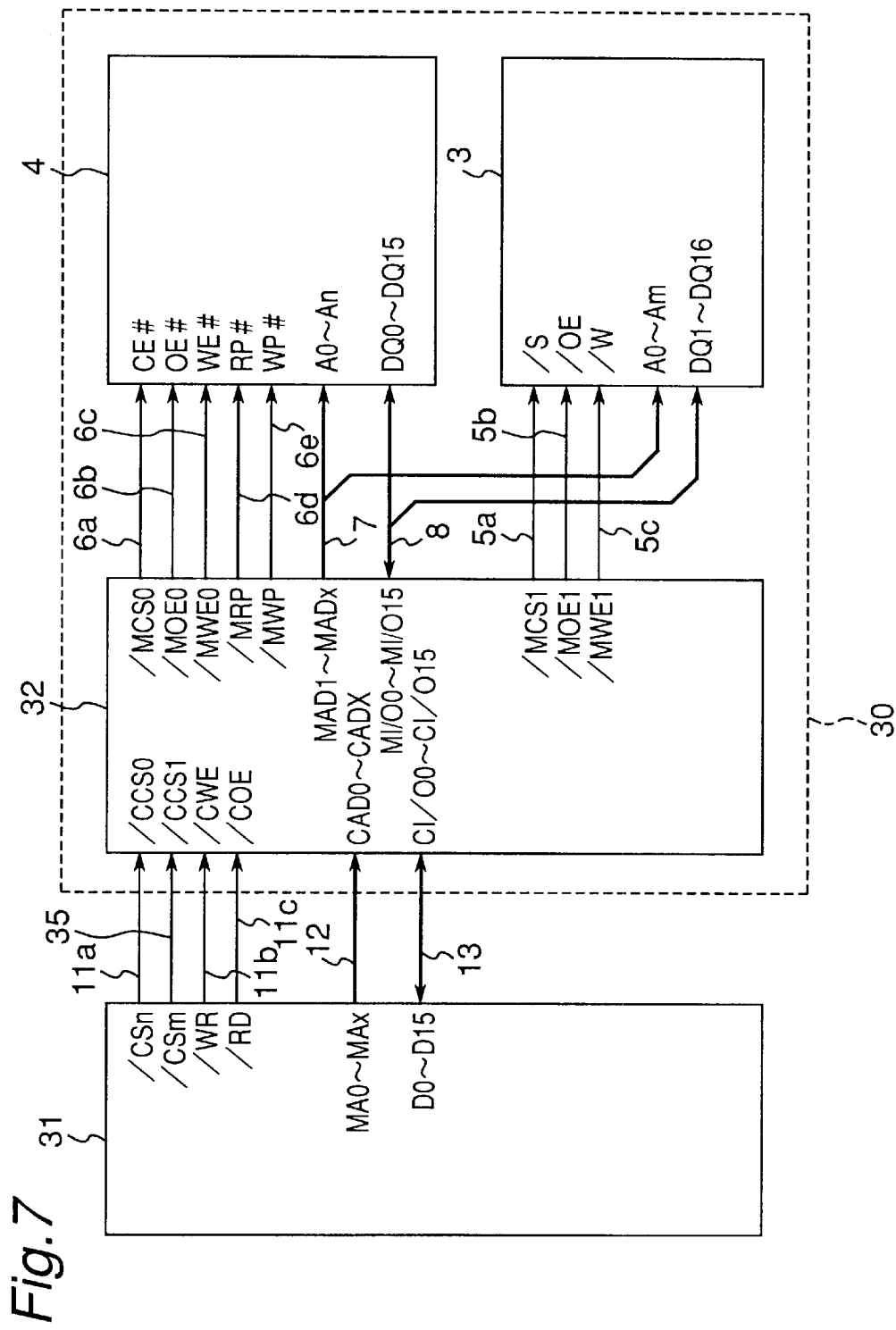
FIG. 7 is a block diagram illustrating the third embodiment of a semiconductor memory system connected with a CPU according to the present invention.

FIG. 7 illustrates the third embodiment of a semiconductor memory system connected with a CPU according to the present invention. The semiconductor memory system denoted by 30 is substantially identical in the construction to that of the first embodiment. Particularly, a controller 32 in the third embodiment has a chip select signal input "CCS1" as the interface port for an external CPU 31. The CPU 31 in turn has a chip select signal output "/CSm" which is connected via a control bus 35 to the "CCS1" port.

The operation of the CPU 31 accessing the semiconductor memory devices 3 and 4 in the semiconductor memory system 30 is similar to that of the conventional system. When the CPU 31 accesses the first semiconductor memory device 3, it shifts the "/CSm" port to L level to select the first semiconductor memory device 3. After selects of the address inputs "A0~Am" of the first semiconductor memory device 3 are determined and the "/RD" port of the CPU 31 is turned to L level, the data reading from the first semiconductor memory device 3 is enabled. After selects of the address inputs "A0~Am" and the data I/O ports "DQ1~DQ16" are determined and the "/WR" port of the CPU 31 is turned to L level, the data writing into the first semiconductor memory device 3 is enabled.

For accessing the second semiconductor memory device 4 from the CPU 31, the reset/power down signal input "RP#" and write protect signal input "WP#" ports of the second semiconductor memory device 4 are turned to H level by the operation of the "/RP" and "/WP" control register 17b as described previously in the first embodiment. When the "/CSn" port of the CPU 31 is turned to L level, the second semiconductor memory device 4 is selected.

This is followed by releasing a read command to the data bus 8 and turning the "/WR" port of the CPU 31 to L level. At the succeeding cycle, when the address-bus 7 is set up and the "/RD" port of the CPU 31 is turned to L level, the data reading from the second semiconductormemory device 4 is enabled. Also, a program command is released to the data bus and the "/WR" port of the CPU 31 is turned to L level. At the succeeding cycle, when the address bus 7 and the data bus 8 are set up and the "/WR" port of the CPU 31 is turned to L level, the data writing into the second semiconductor memory device 4 is enabled.

As explained, the semiconductor memory system 30 allows its semiconductor memory devices to be controlled without using its controller and is thus compatible with a conventional system and can be improved in the utility.

Fourth Embodiment

Figure 8:
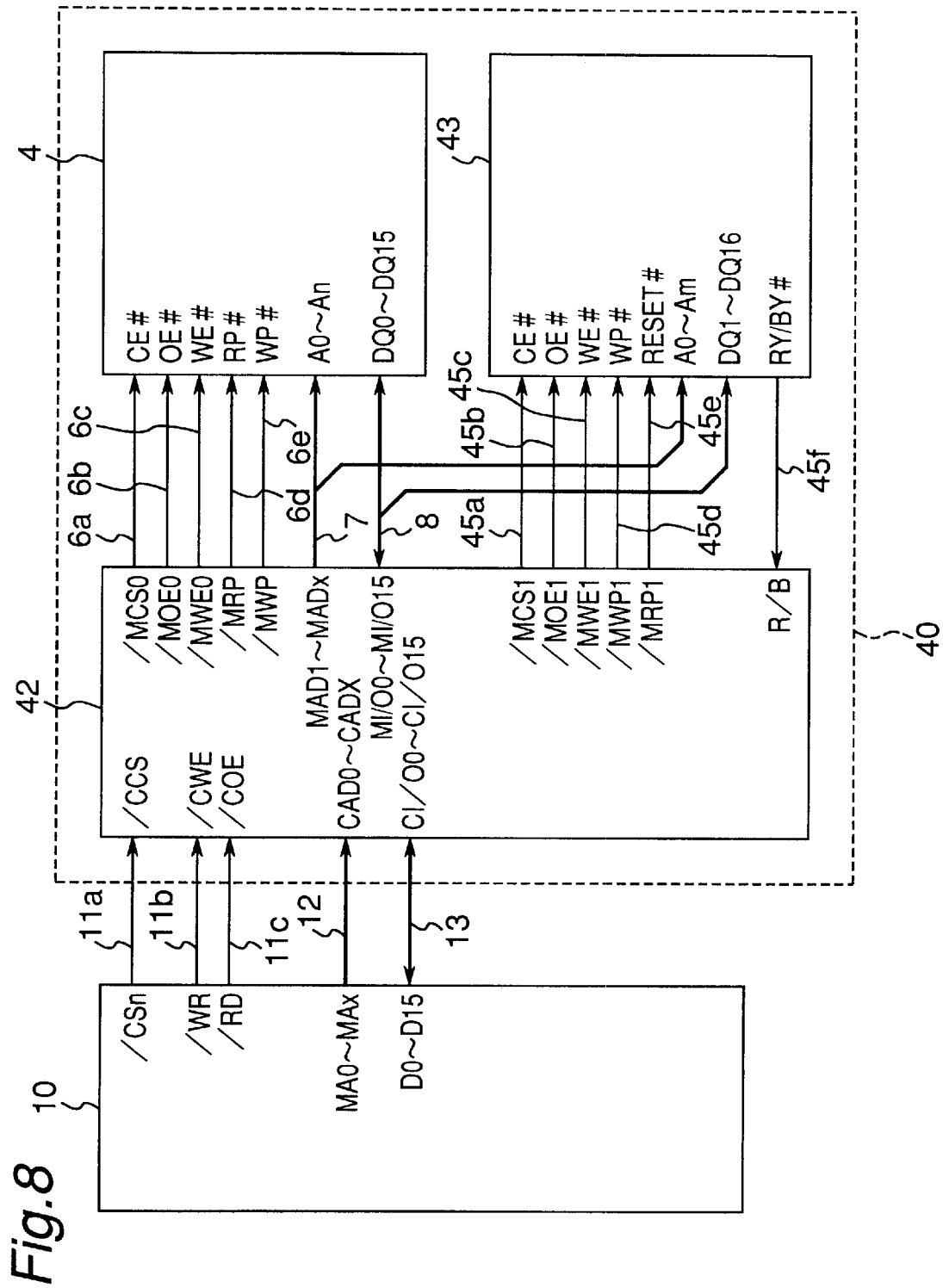
FIG. 8 is a block diagram illustrating the fourth embodiment of a semiconductor memory system connected with a CPU according to the present invention.

FIG. 8 illustrates the fourth embodiment of a semiconductor memory system connected with a CPU according to the present invention. The semiconductor memory system denoted by 40 has, in place of the first semiconductor memory device 3 of the first, second or third embodiment, a first semiconductor memory device 43 arranged responsive to a command for carrying out read and write operations. The first semiconductor memory device 43 has as the interface ports for a controller 42, a chip select signal input "CE#", an output enable signal input "OE#", a write enable signal input "WE#", a write protect signal input "WP#", a reset signal input "RESET#", and a READY/BUSY status signal output "RY/BY#".

The controller 42 has, as the interface ports for the first semiconductor memory device 43, a chip select signal output "/MCS1" which is connected via a control bus 45a to the "CE#" port, an output enable signal output "/MOE1" which is connected via a control bus 45b to the "OE#" port, a write enable signal output "/MWE1" which is connected via a control bus 45c to the "WE#" port, a write protect signal output "/MWP1" which is connected via a control bus 45d to the "WP#" port, a reset/power down signal output "/MRP1" which is connected via a control bus 45e to the "RESET#" port, and a READY/BUSY status signal input "RY/BY" which is connected via a control bus 45f to the "RY/BY#" port of the first semiconductor memory device 43.

Figure 9:
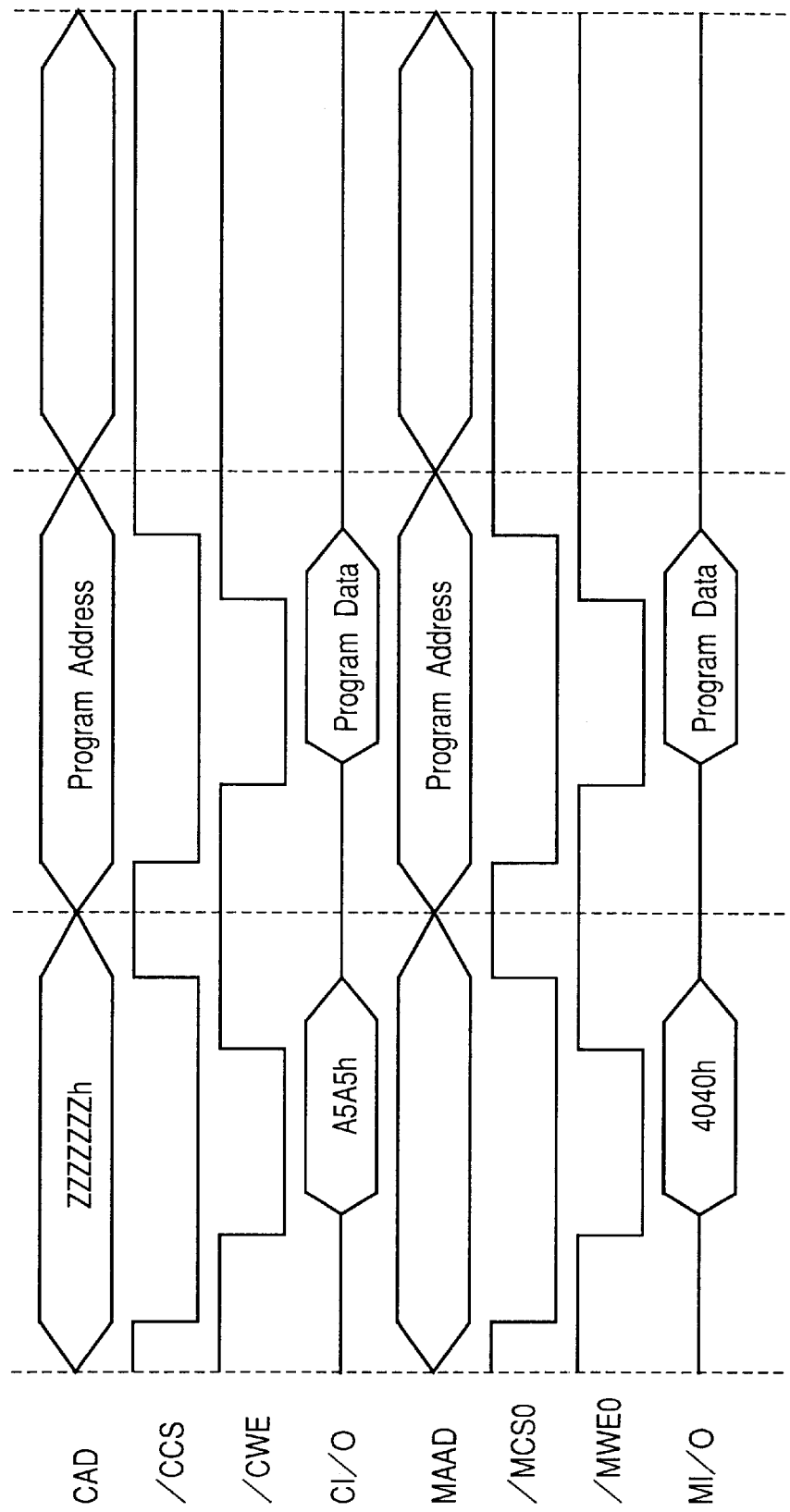
FIG. 9 is a waveform diagram showing the waveform of external signals in the fourth embodiment of the semiconductor memory system during the data writing into the first and second semiconductor memory devices.
Figure 10:
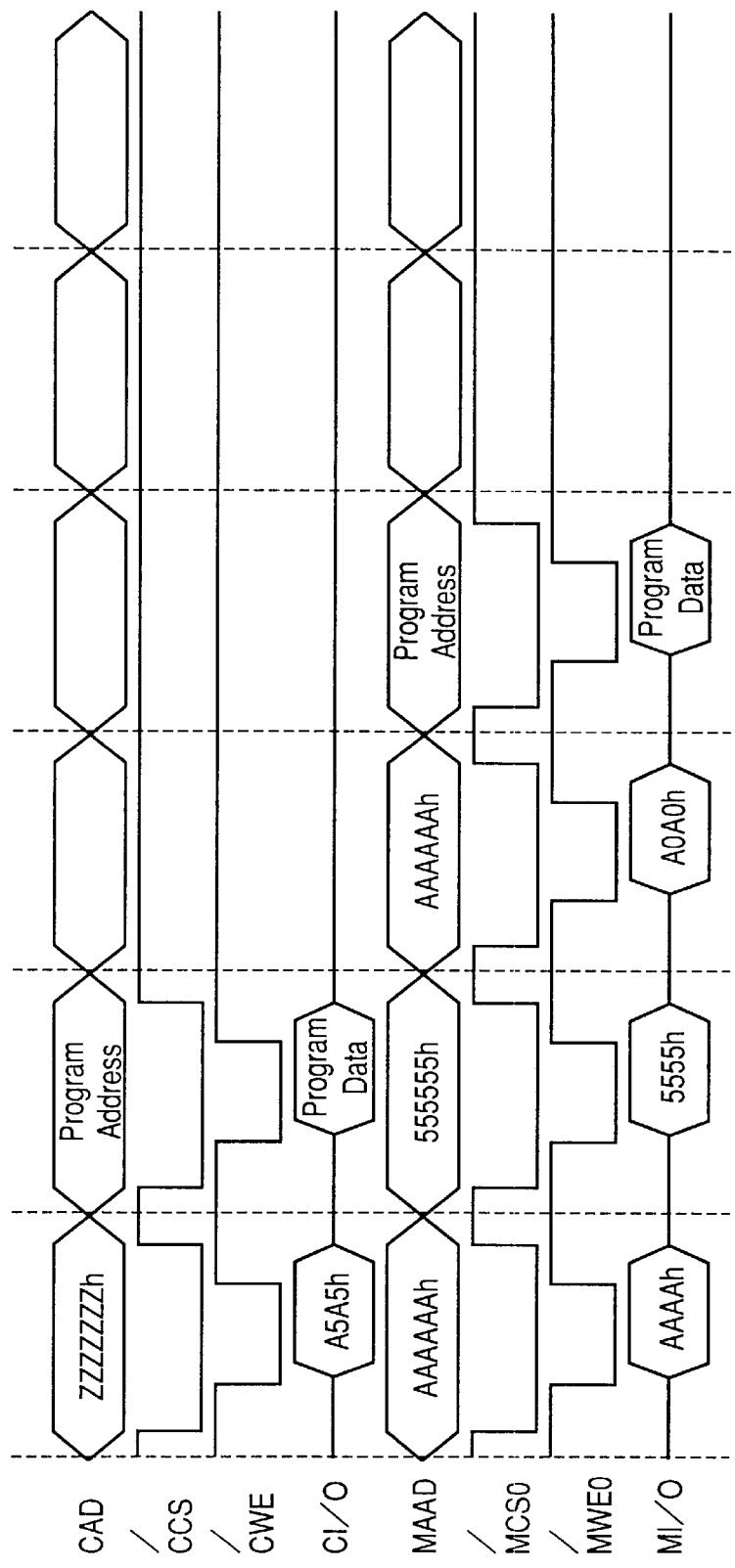
FIG. 10 is a waveform diagram showing the waveform of internal signals in the fourth embodiment of the semiconductor memory system during the data writing into the first and second semiconductor memory devices.

FIGS. 9 and 10 illustrate the waveform of external and internal signals of the controller 42 during the data writing into the first and second semiconductor memory devices 43 and 4. In the fourth embodiment of the present invention, the first connected semiconductor memory device setting register 17d and the second connected semiconductor memory device setting register 17e are used, each of which is comprised in the group of the control registers shown in FIG. 3.

The operation of the semiconductor memory system 40 is now explained. The operation starts with the CPU 10 assigning the registers 17d and 17e with the type of the semiconductor memory devices 43 and 4 in the semiconductor memory system 40 connected thereto. More particularly, the first connected semiconductor memory device setting register 17d is set with the value of the semiconductor memory device connected thereto. Similarly, the second connected semiconductor memory device setting register 17e is set with the value of the semiconductor memory device connected thereto.

This, shown in FIGS. 9 and 10, permits the signals from the CPU 10 to be modified and received in the waveform suited for controlling the operation of the two semiconductor memory devices 43 and 4. Simultaneously, the "WP#", "RP#", and "RESET#" ports of the semiconductor memory devices 43 and 4 are turned to H level by the operation of the "/RP" and "/WP" control register 17b.

As the semiconductor memory system 40 allows the two semiconductor memory devices 43 and 4, which are different in the way of data reading and writing, to be properly controlled by a single manner without changing the control software, its utility can be improved.

Fourth Embodiment

Figure 11:
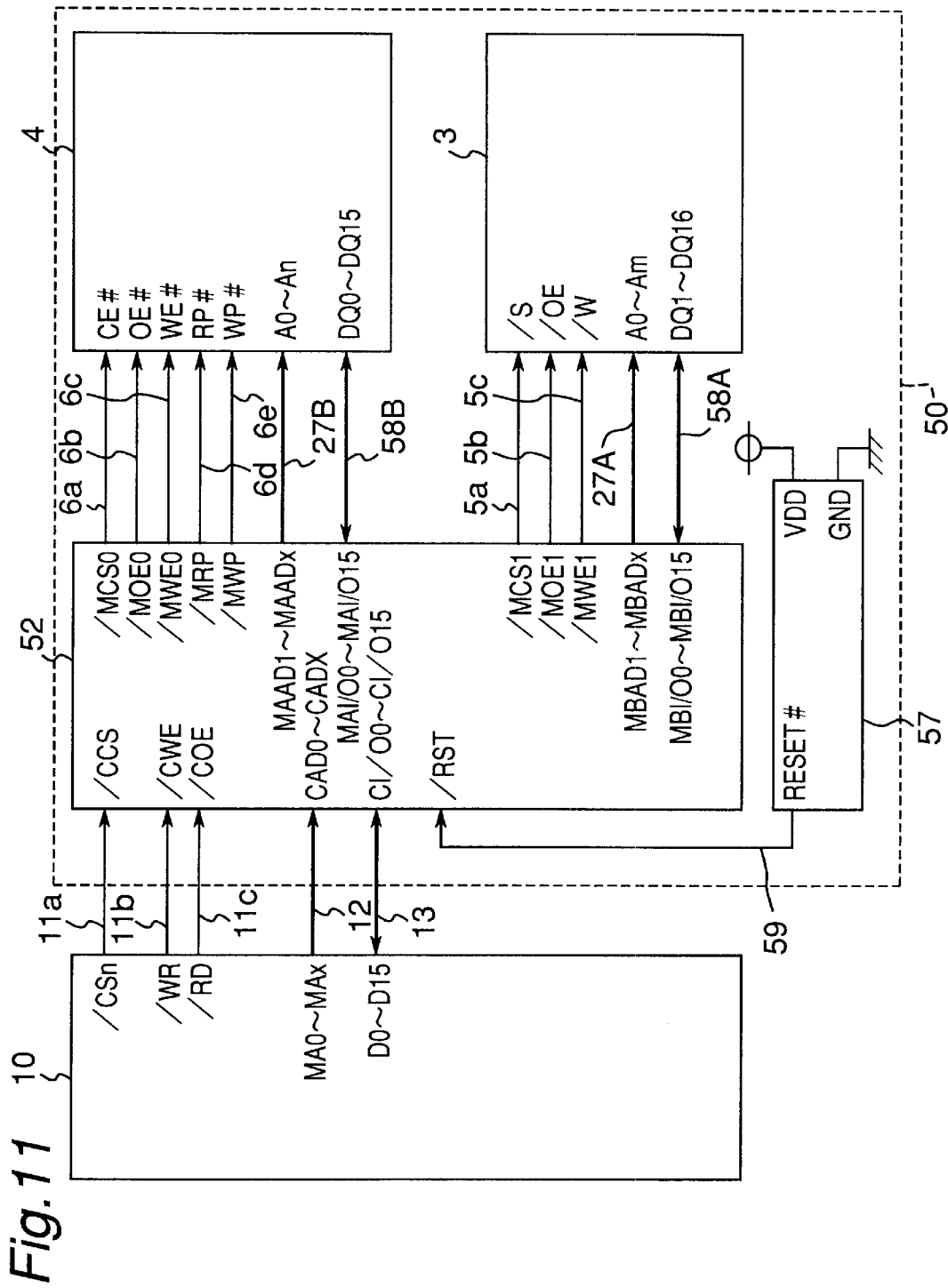
FIG. 11 is a block diagram illustrating the fifth embodiment of a semiconductor memory system connected with a CPU according to the present invention.

FIG. 11 illustrates the fifth embodiment of a semiconductor memory system connected with a CPU according to the present invention. The semiconductor memory system denoted by 50 is substantially identical in the construction to that of the second embodiment. In the fifth embodiment, a voltage detecting circuit 57 is added while the controller 22 is replaced by a controller 52 which has, as the interface ports for the first and the second semiconductor memory devices 3 and 4, a group of data outputs "MBI/O0~MBI/O15" for the first semiconductor memory device 3 and another group of data outputs "MAI/O0~MAI/O15" for the second semiconductor memory device 4. The first semiconductor memory device 3 of the fifth embodiment is a volatile memory while the second semiconductor memory device 4 is a nonvolatile memory.

The voltage detecting circuit 57 has, as the interface port for the controller 52, a reset signal output "RESET#" and, as the external ports, a voltage port "VDD" which is connected to a power source and a grounding port "GND". The controller 52 in turn has a reset signal input "/RST" which is connected via a control bus 59 to the "RESET#" port of the voltage detecting circuit 57.

Also, the controller 52 has two groups of data outputs "MAI/O0~MAI/O15" and "MBI/O0~MBI/O15" which are connected via a data bus 58A to corresponding data inputs "DQ1~DQ16" of the first semiconductor memory device 3 and via a data bus 58B to corresponding data inputs "DQ0~DQ15" of the second semiconductor memory device 4.

Figure 12:
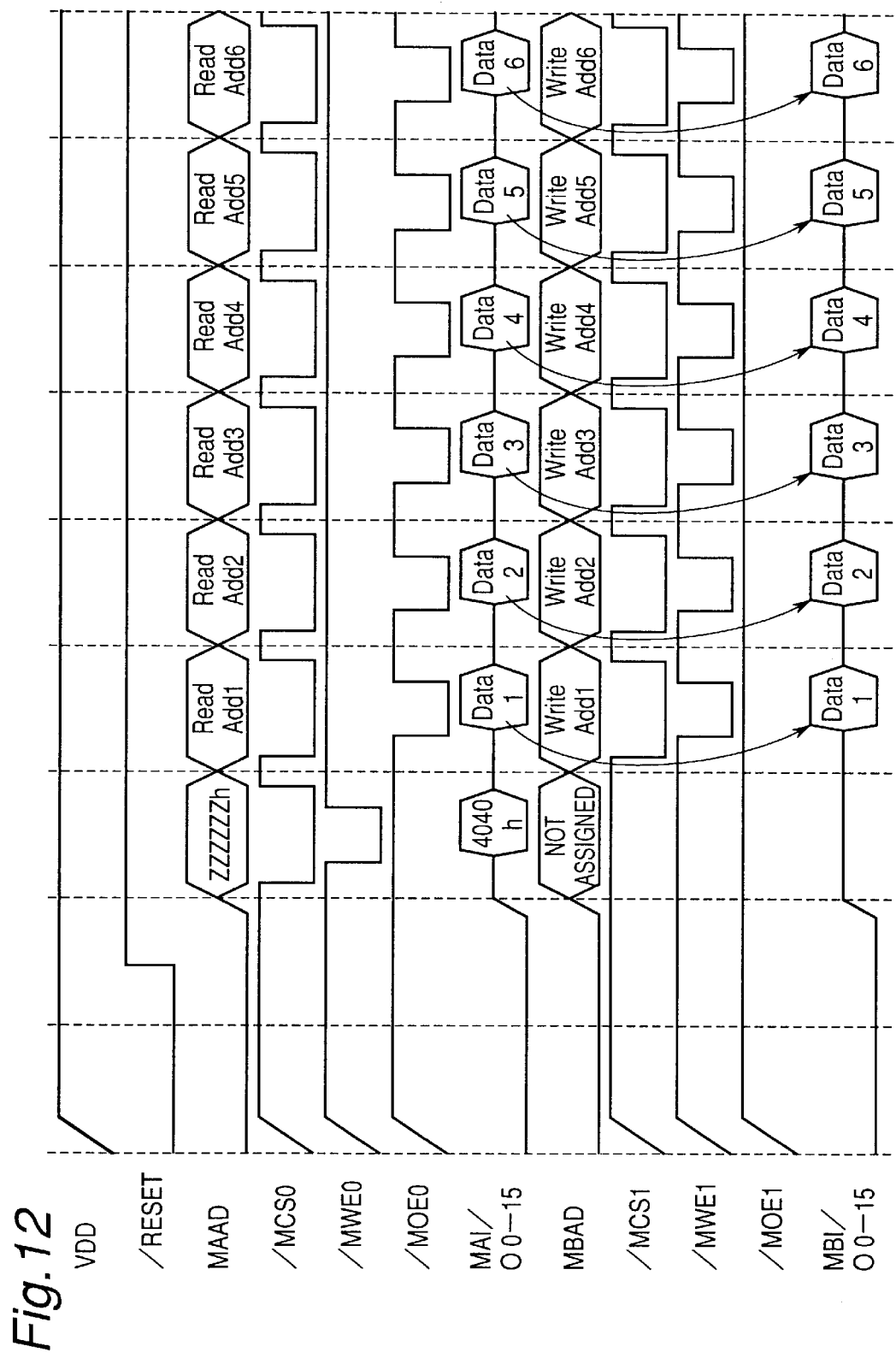
FIG. 12 is a waveform diagram showing the waveform of signals in the fifth embodiment of the semiconductor memory system when connected to a power supply.

FIG. 12 illustrates the waveform of signals in the semiconductor memory system 50 when the power source is connected. The operation of the semiconductor memory system 50 will now be described referring to FIG. 12.

As the voltage detecting circuit 57 detects the connection to the power source, it generates a reset signal. At the succeeding cycle where the reset signal is canceled, the operation of reading data from the predetermined address of the second semiconductor memory device 4 is enabled. Simultaneously, the address bus, control bus, and data bus are enabled for writing the readout data into a specified address of the first semiconductor memory device 3.

As understood, the predetermined data is automatically transferred upon detection of the connection to a power supply. This allows every user to immediately start its job using the data without carrying out a preparatory job for acquiring the data, thus improving the utility of the system. Also, as the transfer of the data is executed with no use of the CPU 10, any load to the CPU 10 generated at the connection to the power supply can be minimized. Moreover, the system of the fifth embodiment allows the programs to be enabled upon connection to the power supply.

Sixth Embodiment

Figure 13:
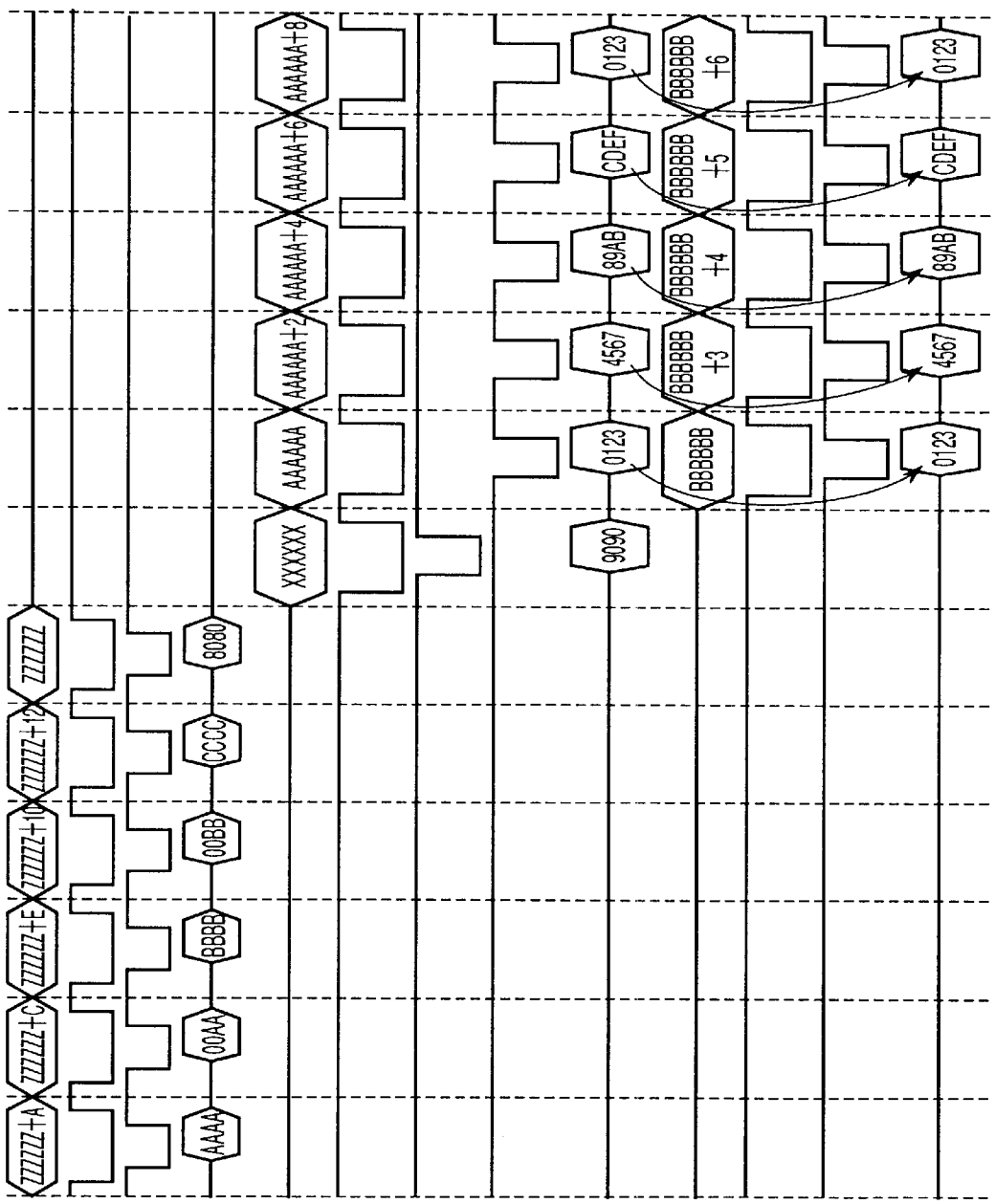
FIG. 13 is a waveform diagram showing the waveform of internal signals in the sixth embodiment of a semiconductor memory system according to the present invention during the transfer of data.
Figure 14:
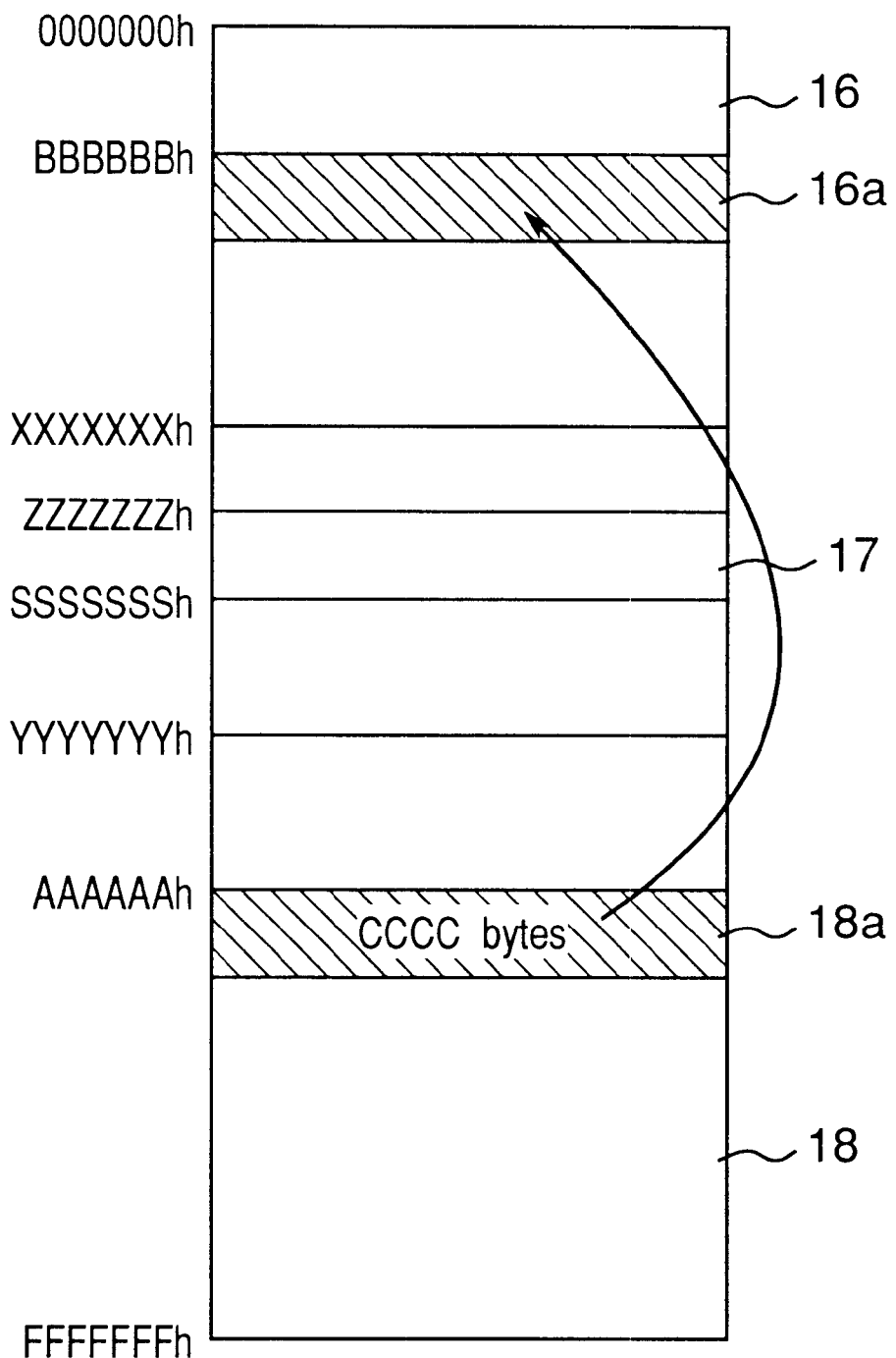
FIG. 14 is a schematic diagram showing the memory area in the sixth embodiment of the semiconductor memory system.

The sixth embodiment of a semiconductor memory system according to the present invention is substantially identical in the construction to that of the fifth embodiment and will thus be described referring to FIG. 11. FIG. 13 illustrates the waveform of internal signals in the semiconductor memory system, denoted by 50, during the transfer of data. FIG. 14 illustrates a memory area in the semiconductor memory system 50. As shown in FIG. 14, a data of CCCC bytes is transferred from a memory area 18 addressed by AAAAAAh in the second semiconductor memory device 4 to a memory area 16 addressed by BBBBBBh in the first semiconductor memory device 3.

In the sixth embodiment of the present invention, the sender address register 17f, the receiver address register 17g, the transfer data register 17h, and the data transfer control register 17i are used, each of which is comprised in the group of control registers shown in FIG. 3.

The operation of the semiconductor memory system 50 will now be explained. The operation starts with the CPU 10 writing the address of a sender into the sender address register 17f shown in FIG. 13. Then, the CPU 10 writes the address of a receiver into the receiver address register 17g and the amount of data to be transferred into the transfer data register 17h. The data transfer control register 17i is then loaded with a command (8080) for transferring the data from the first semiconductor memory device 3 to the second semiconductor device 4. As a result, the transfer of the data is initiated using the internal buses in the semiconductor memory system 50 as shown in FIG. 13.

More particularly, the first semiconductor memory device 3 is loaded with a read command (9090). Then, a number of bytes determined by the transfer data register 17h are read out in a sequence from the address in the sender. Simultaneously, a selection of the readout data determined by the receiver address is written into the second semiconductor memory device 4.

Accordingly, when the controller 52 is loaded with the transfer command using the registers assigned with the sender address, the receiver address, and the amount of data to be transferred, it can transfer the data internally with no use of the CPU 10. As a result, any unwanted load to the CPU 10 can be minimized. Also, as the buses connected to the CPU 10 are not used, other jobs using the buses can be initiated without difficulty. The utility of the system can thus be improved.

Seventh Embodiment

Figure 15:
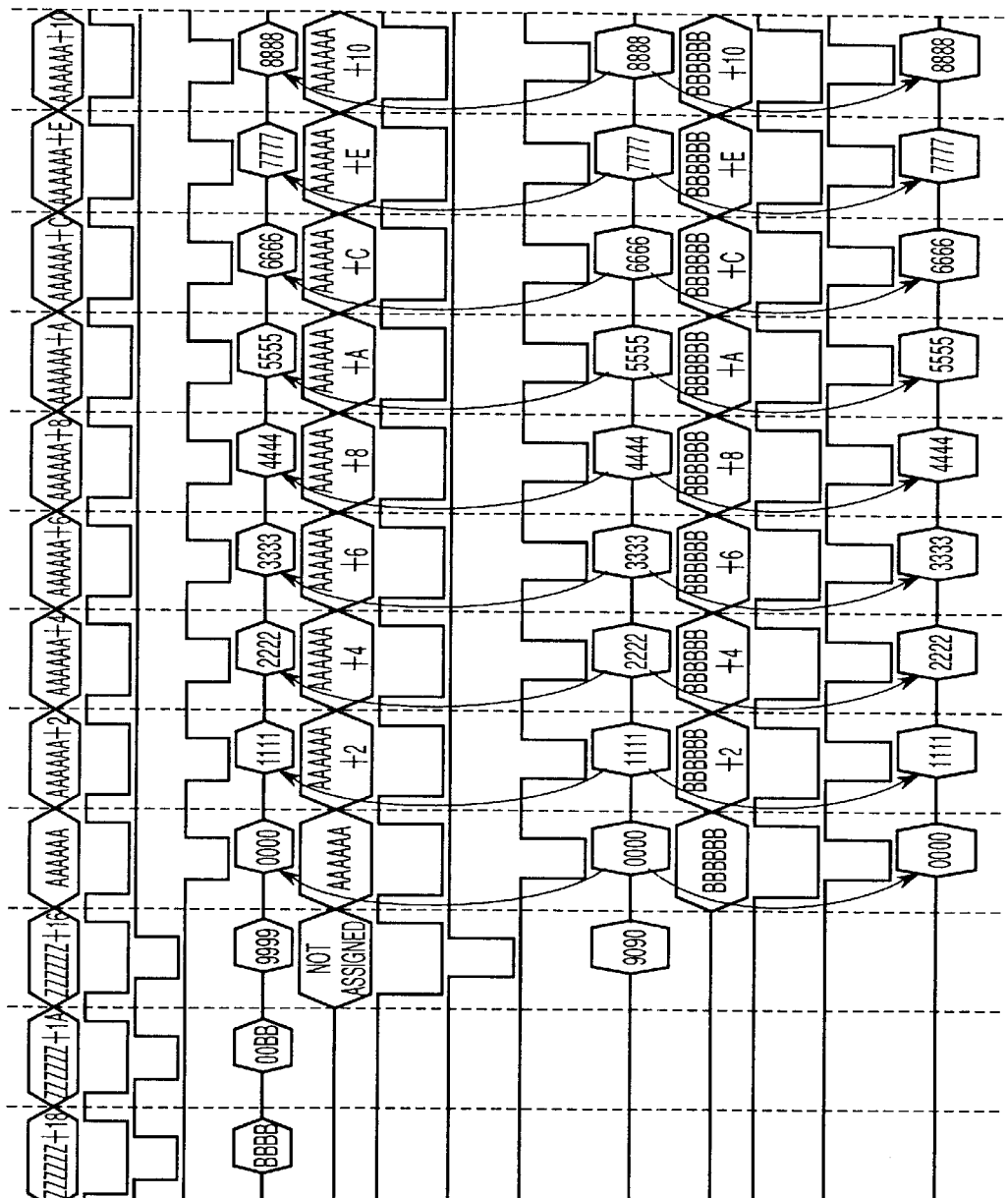
FIG. 15 is a waveform diagram showing the waveform of internal and external signals in the seventh embodiment of a semiconductor memory system according to the present invention during the data reading.

The seventh embodiment of a semiconductor memory system according to the present invention is substantially identical in the construction to that of fifth embodiment and will be described referring to FIG. 11. FIG. 15 illustrates the waveform of input and output signals in the semiconductor memory system, denoted by 50, during the data reading.

In the seventh embodiment of the present invention, the simultaneous read/write control register 17j and the write address register 17k are used, each of which is comprised in the group of the control registers shown in FIG. 3.

The operation of the semiconductor memory device 50 will now be explained. The operation starts with the CPU 10 assigned the write address register 17k with a write address. Then, the simultaneous read/write control register 17j is loaded with a command (9999h) for reading data from the second semiconductor memory device 4 and simultaneously writing the data into the first semiconductor memory device 3. As determined by the control registers shown in FIG. 3, the second semiconductor memory device 4 is loaded with the read command and the data is read out from the second semiconductor memory device 4. The readout data is transferred from the MAI/O port via the CI/O to the D0 to D15 ports of the CPU 10. The same data is transferred from the MAI/O port via the MBI/O port to and saved in a sequence in the address of the first semiconductor memory device 3 determined by the write address signal.

As the data reading is carried out simultaneously while the data is written into a desired semiconductor memory device, the duration of time required for transfer of the data can be minimized and the utility of the system can thus be improved.

Eighth Embodiment

Figure 16:
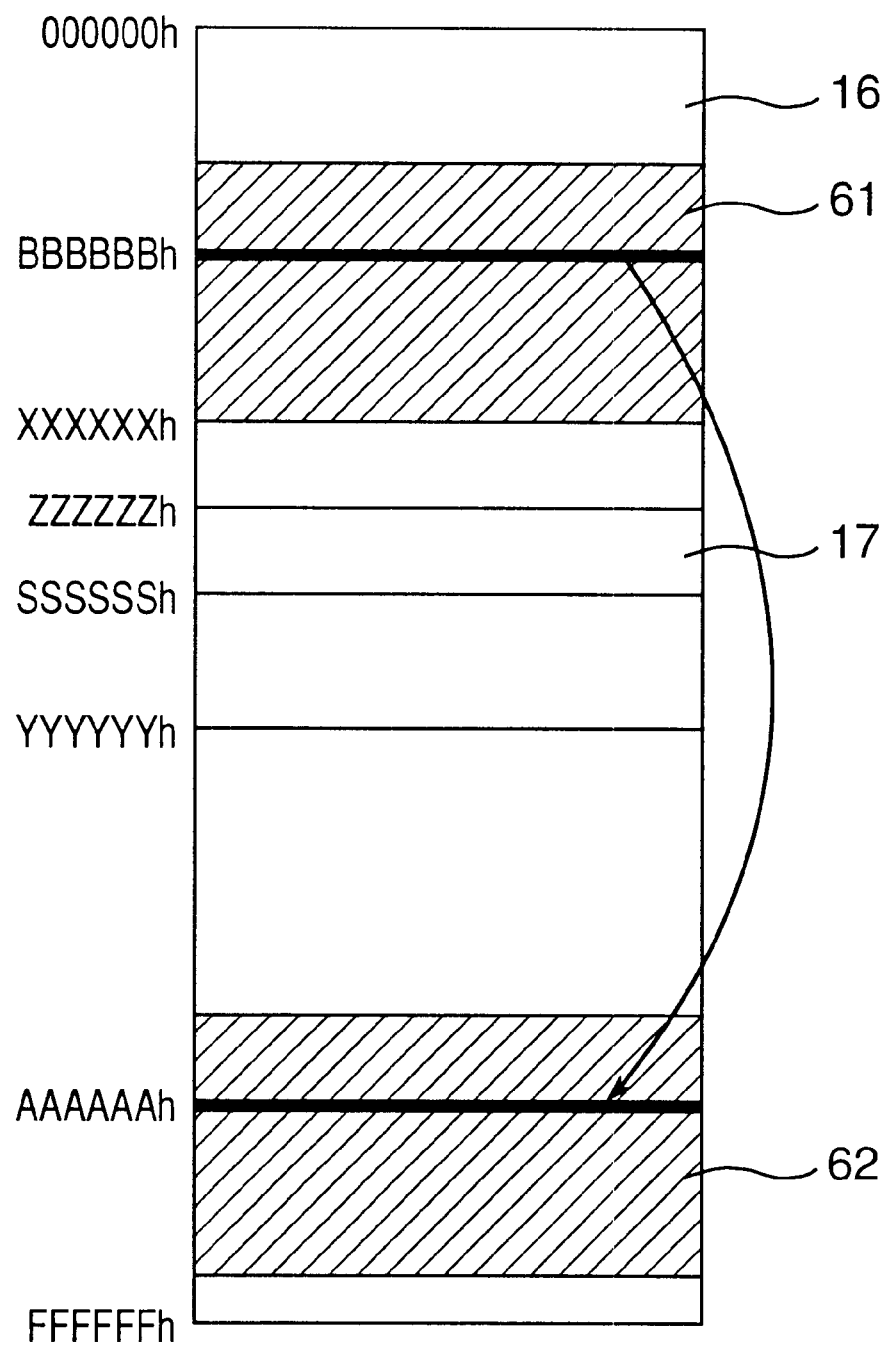
FIG. 16 is a schematic diagram of memory areas for the backup process showing a part of the memory areas in the eighth embodiment of a semiconductor memory system according to the present invention.

The eighth embodiment of a semiconductor memory system according to the present invention is substantially identical in the construction to that of the fifth embodiment and will be described referring to FIG. 11. FIG. 16 is a schematic diagram of a part of the memory area in the semiconductor memory system denoted by 50, showing memory areas for data backup. As shown in FIG. 16, the area of the first semiconductor memory device 3 includes a volatile memory area 61 for carrying out a data backup operation. Also, the area of the second semiconductor memory device 4 includes a nonvolatile memory area 62 for storing a backup data.

Figure 17:
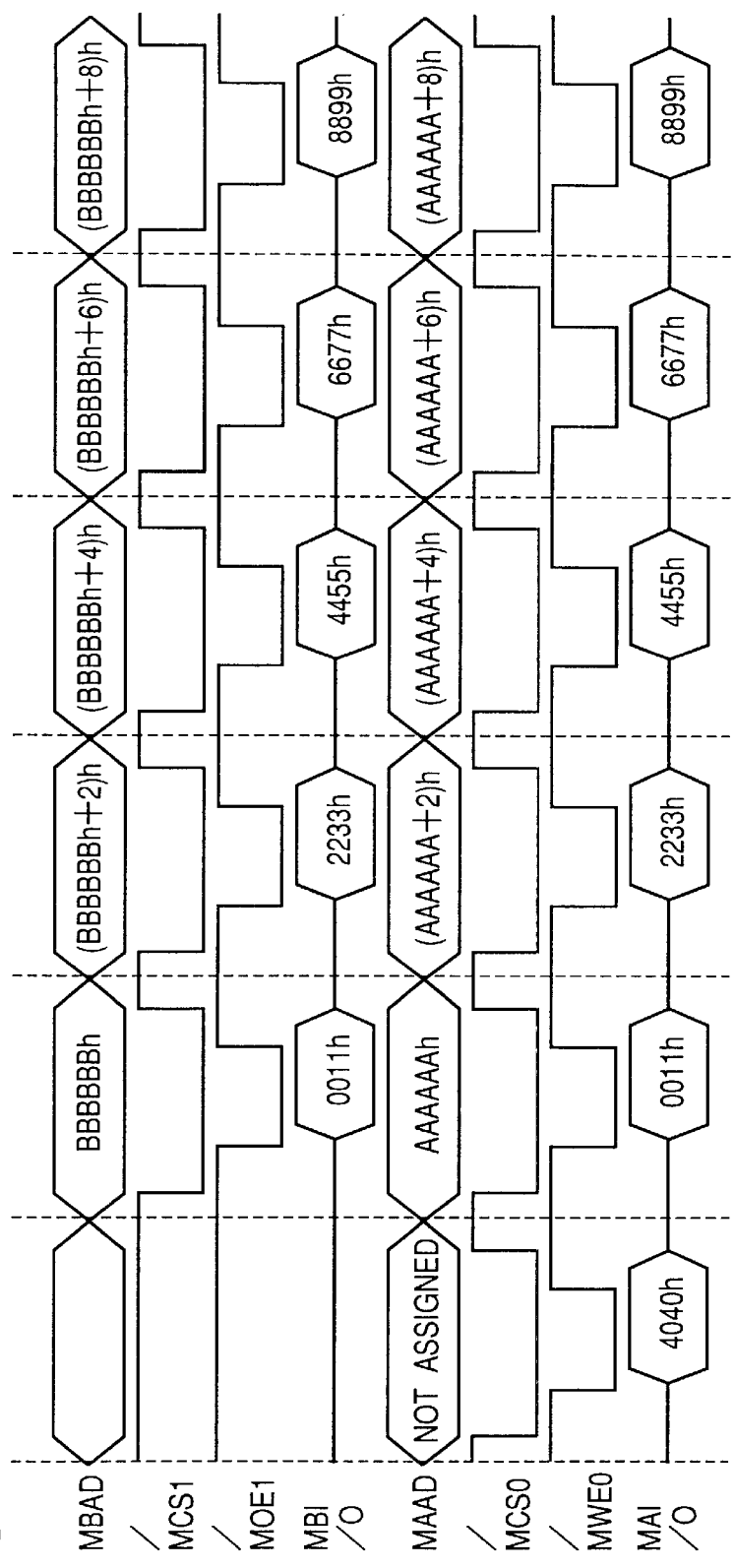
FIG. 17 is a waveform diagram showing the waveform of internal signals of the controller 10 in the eighth embodiment of the semiconductor memory system.

FIG. 17 illustrates the waveform of signals of a controller 52 in the semiconductor memory system 50. The operation of the semiconductor memory device 50 will now be explained. The operation starts with the CPU 10 assigning the automatic backup control register 171 in the controller 52 with automatic backup setting. Then, data in the volatile memory area 61 is backed up at intervals of a given time in the nonvolatile memory area 62. The waveform of signals during the backup operation is shown in FIG. 17 where the data is programmed in the second semiconductor memory device 4 which has been loaded with a program command upon the data reading from the first semiconductor memory device 3.

As the controller 52 performs a backup operation for the first 3 and the second semiconductor memory device 4, any load to the CPU 10 can be minimized. Also, as its overall processing is fastened, the system can significantly be improved in the performance.

Ninth Embodiment

Figure 18:
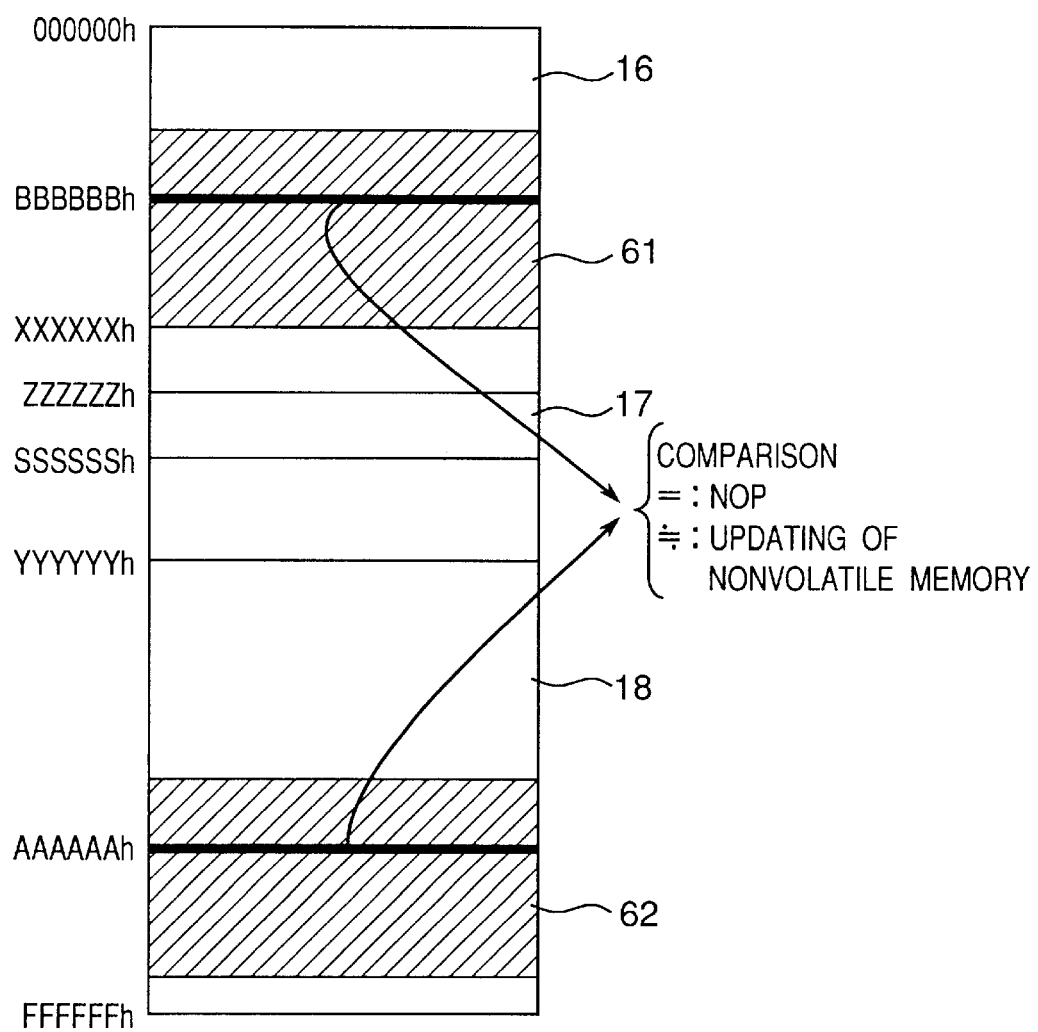
FIG. 18 is a schematic diagram showing a data comparison updating process in the memory areas of the ninth embodiment of a semiconductor memory system according to the present invention.
Figure 19:
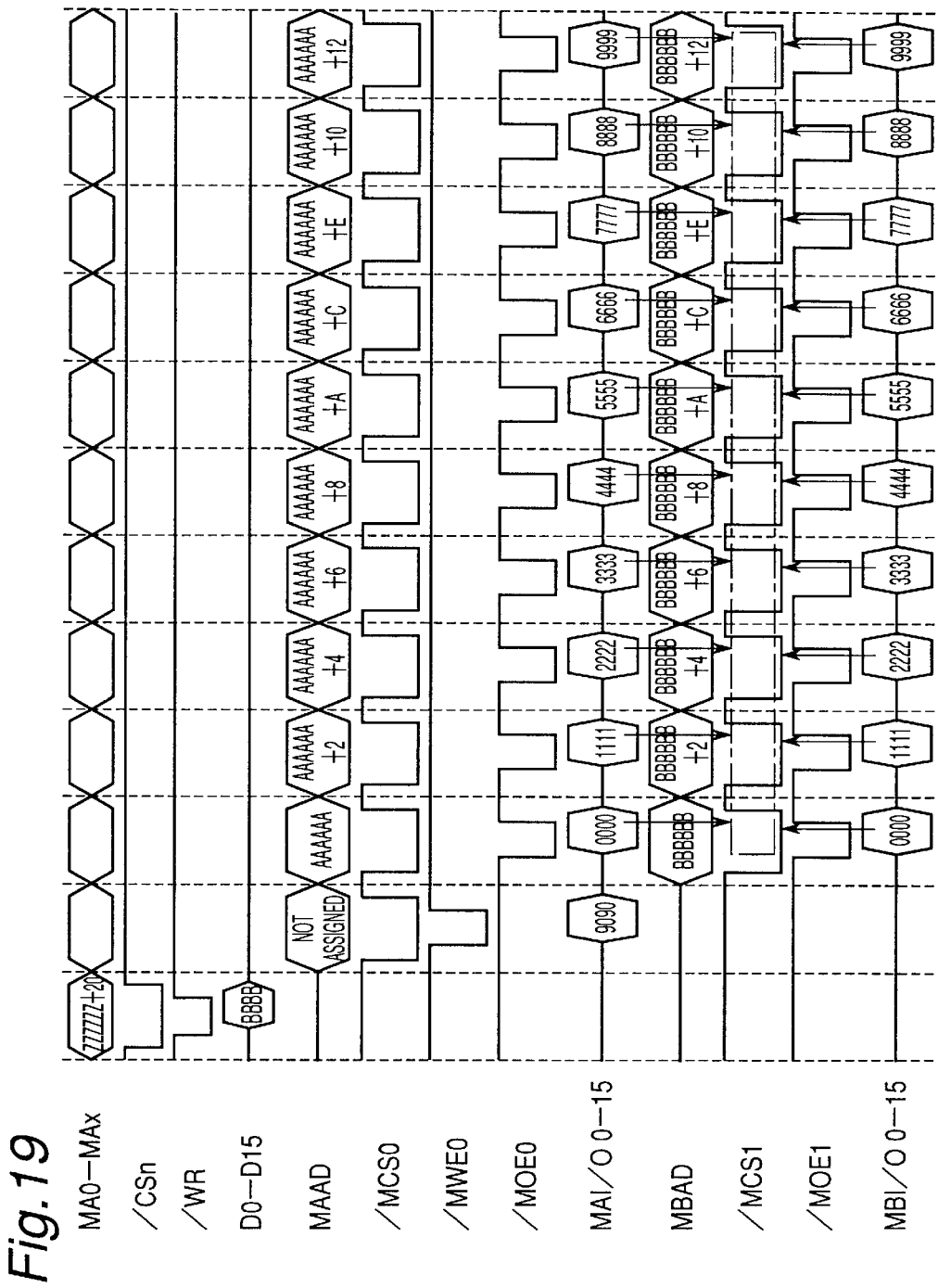
FIG. 19 is a waveform diagram showing the waveform of internal signals in the ninth embodiment of the semiconductor memory system.

The ninth embodiment of a semiconductor memory system according to the present invention is substantially identical in the construction to that of the fifth embodiment and will be described referring to FIG. 11. FIG. 18 is a schematic diagram showing a comparison updating process in the memory area of the semiconductor memory system 50. FIG. 19 illustrates the waveform of signals in the semiconductor memory system 50. In the ninth embodiment of the present invention, the comparison updating control register 17m is used, which is comprised in the group of the control registers shown in FIG. 3.

The operation of the semiconductor memory system 50 will now be described. The operation starts with the CPU 10 assigning the comparison updating control register 17m with a comparison updating command (2222h). Then, two data are simultaneously read out from the first 3 and the second semiconductor memory device 4 respectively and compared with each other in the semiconductor memory system 50 as shown in FIG. 19. The process of comparison is carried out within a predetermined range. When the two data read out from the semiconductor memory devices 3 and 4 are equal to each other, the comparison is repeated over the succeeding address. If the two data from the semiconductor memory devices 3 and 4 are not equal, the data in the volatile semiconductor memory device 3 is transferred to and saved in the nonvolatile semiconductor memory device 4 and the process of updating the data is carried out. The updating is repeated within the range.

As described, the controller 52 is arranged to carry out the backup operation for the memory area in the semiconductor memory system 50 regardless of the load to the CPU 10. Accordingly, any load to the CPU 10 can be minimized and the system can be improved as a total in the performance. Also, the two data read out at once from the semiconductor memory devices 3 and 4 are compared from each other. This can reduce the time required for carrying out the comparison updating process as compared with reading the two data separately. Furthermore, in the ninth embodiment, the semiconductor memory system 50 is allowed to access a microcomputer at higher speeds. As the data can be maintained after deenergized, the system can be improved in the utility.

Tenth Embodiment

Figure 20:
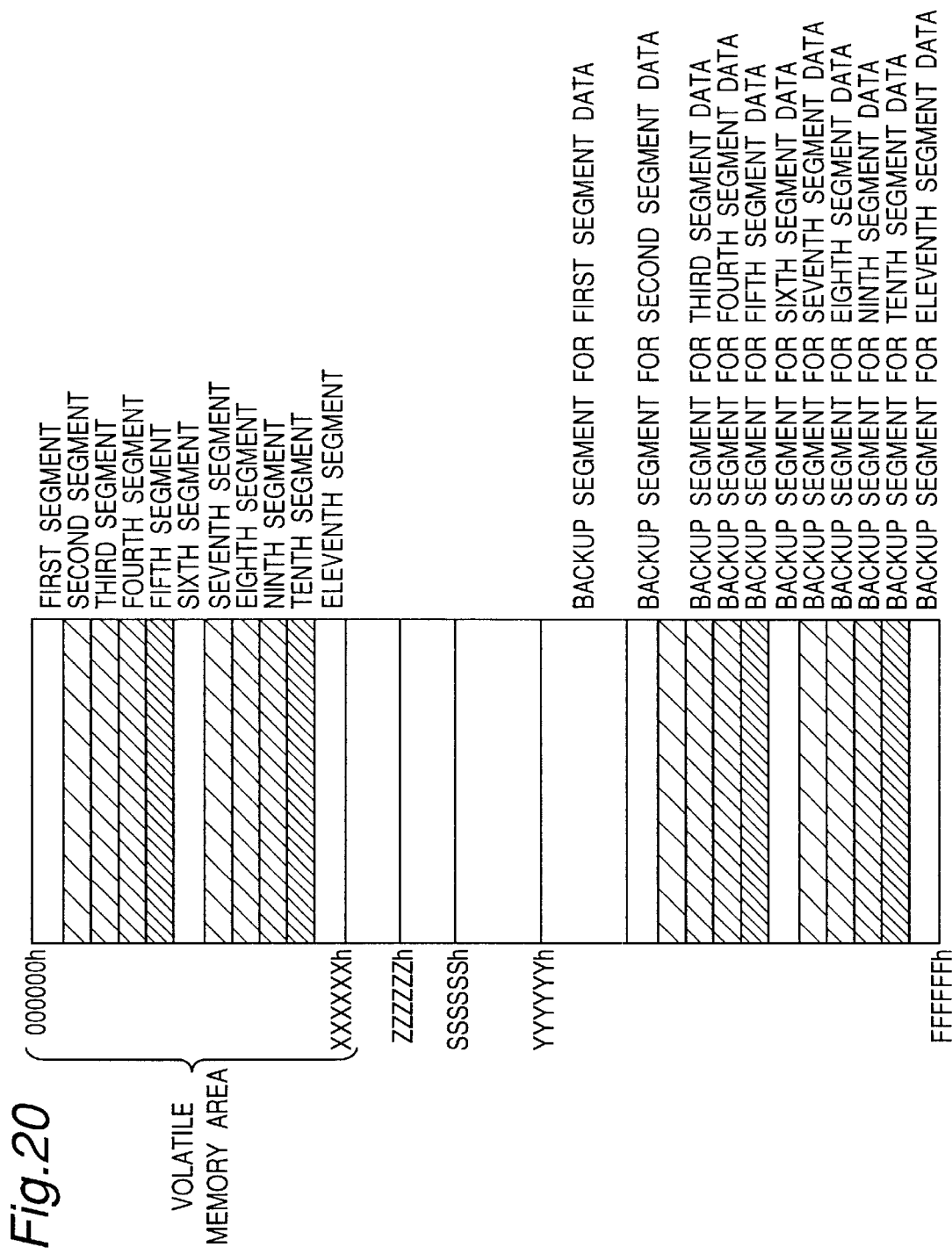
FIG. 20 is a schematic diagram of a management of segments in the memory area of a volatile semiconductor memory device of the tenth embodiment of a semiconductor memory system according to the present invention.
Figure 22:
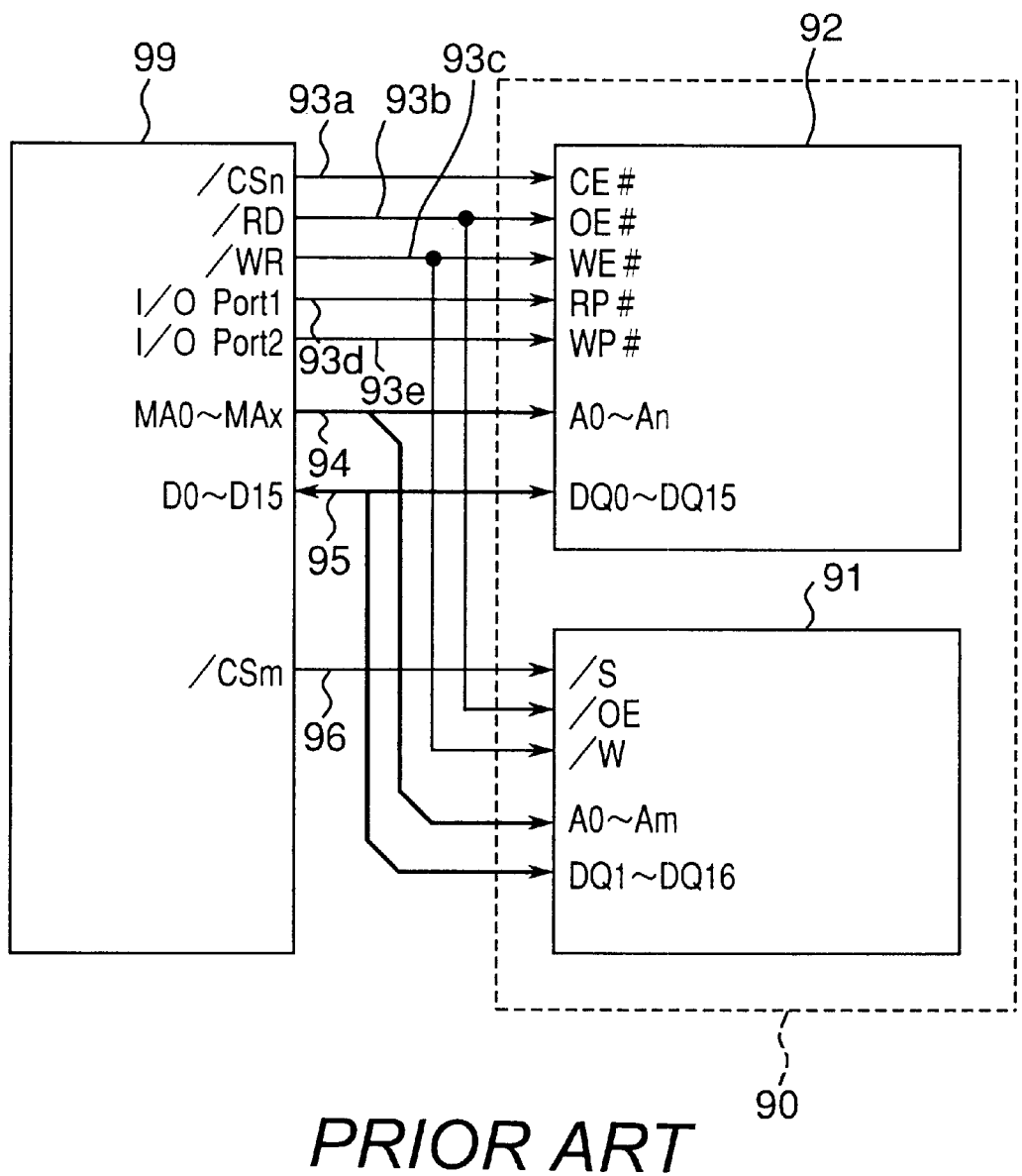
FIG. 22 is a diagram showing a conventional semiconductor memory system connected with a CPU.

The tenth embodiment of a semiconductor memory system according to the present invention is substantially identical in the construction to that of the fifth embodiment and will be described referring to FIG. 11. FIG. 20 schematically illustrates a management of segments in the memory area of a volatile semiconductor memory device 3. FIG. 21 illustrates an updating flag register (ZZZZZZ+20)h for the separated memory area. The waveform of signals of the eighth embodiment shown in FIG. 17 includes the signals for updating process in the semiconductor memory system 50.

The operation of the semiconductor memory system 50 will now be explained. For example, when the CPU 10 rewrites a segment in the memory area of the volatile semiconductor memory device 3, more particularly, a third segment in the memory area, it assigns the updating flag register with bit 2 to inform the controller 52 of updating of the segment, as shown in FIG. 21. Upon receiving the flag, the controller 52 reads data from the volatile semiconductor memory device 3 and simultaneously writes the data into the nonvolatile semiconductor memory device 4 so that the third segment is updated.

In the tenth embodiment, the controller 52 is allowed to automatically detect an updated segment in the volatile semiconductor memory device 3 and write the data of the segment into the nonvolatile semiconductor memory device 4. More specifically, as the memory updating process can be conducted in each segment, its time requirement can be minimized. Accordingly, the backup process can be increased in the efficiency. Also, the reliability of data and the utility of the system can be improved.

It would be understood that the present invention is not limited to the foregoing embodiments illustrated and various changes and modifications in the design may be made without departing from the scope of the present invention.

What is claimed is:

1. A semiconductor memory system having a set of semiconductor memory devices of which the read and write operations can be controlled by commands received from an external CPU, comprising:

a semiconductor memory device having a chip select signal input, an output enable signal input, a write enable signal input, address inputs and data I/O ports, and arranged so that data reading and writing at high speeds is performed through the interface of the buses connected to the address inputs and the data I/O ports;

a semiconductor memory device having a chip select signal input, an output enable signal input, a write enable signal input, address inputs and data I/O ports, and arranged so that data reading and writing is controlled by commands provided via the data I/O ports; and a controller arranged responsive to commands from the CPU for controlling the read and write operation of each of the semiconductor memory devices, wherein a single write operation of the CPU to the controller can simultaneously write the same data into the semiconductor memory devices.

2. A semiconductor memory system having a set of semiconductor memory devices of which the read and write operations can be controlled by commands received from an external CPU, comprising:

a semiconductor memory device having a chip select signal input, an output enable signal input, a write enable signal input, address inputs and data I/O ports, and arranged so that data reading and writing at high speeds is performed through the interface of the buses connected to the address inputs and the data I/O ports;

a semiconductor memory device having a chip select signal input, an output enable signal input, a write enable signal input, address inputs and data I/O ports, and arranged so that data reading and writing is controlled by commands provided via the data I/O ports; and a controller having an output address offset register for controlling the read and write operation of each of the semiconductor memory devices, wherein a single write operation to the controller can simultaneously write the same data into different addresses of the semiconductor memory devices.

3. A semiconductor memory system having a set of semiconductor memory devices of which the read and write operations can be controlled by commands received from an external CPU, comprising:

a semiconductor memory device having a chip select signal input, an output enable signal input, a write enable signal input, address inputs and data I/O ports, and arranged so that data reading and writing at high speeds is performed through the interface of the buses connected to the address inputs and the data I/O ports;

a semiconductor memory device having a chip select signal input, an output enable signal input, a write-enable signal input, address inputs, and data I/O ports and arranged for data reading and writing with commands received through the data I/O ports; and a controller arranged for controlling the read and write operation of each of the semiconductor memory devices, wherein when the controller is set with a specific mode, each of the semiconductor memory devices can directly be accessed without passing through the controller.

4. A semiconductor memory system having a set of semiconductor memory devices of which the read and write operations can be controlled by commands received from an external CPU, comprising:

semiconductor memory devices, each having a chip select signal input, an output enable signal input, a write enable signal input, address inputs and data I/O ports, and arranged so that data reading and writing is controlled by different commands provided via the corresponding data I/O ports; and a controller having for controlling the read and write operation of each of the semiconductor memory devices, wherein the access to any of the semiconductor memory devices can be conducted by a common command during the read and write operation through the controller.

5. A semiconductor memory system having a set of semiconductor memory devices of which the read and write operations can be controlled by commands received from an external CPU, comprising:

a volatile semiconductor memory device having a chip select signal input, an output enable signal input, a write enable signal input, address inputs and data I/O ports, and arranged so that data reading and writing at high speeds is performed through the interface of the buses connected to the address inputs and the data I/O ports;

a nonvolatile semiconductor memory device having a chip select signal input, an output enable signal input, a write enable signal input, address inputs and data I/O ports, and arranged so that data reading and writing is controlled by commands provided via the data I/O ports; and a controller arranged for controlling the read and write operation of each of the semiconductor memory devices, wherein upon connection to a power supply, a data saved in a part or the entire area of the nonvolatile semiconductor memory device can automatically be transferred to the volatile semiconductor memory device.

6. A semiconductor memory system having a set of semiconductor memory devices of which the read and write operations can be controlled by commands received from an external CPU, comprising:

a semiconductor memory device having a chip select signal input, an output enable signal input, a write enable signal input, address inputs and data I/O ports, and arranged so that data reading and writing at high speeds is performed through the interface of the buses connected to the address inputs and the data I/O ports;

a semiconductor memory device having a chip select signal input, an output enable signal input, a write enable signal input, address inputs and data I/O ports, and arranged so that data reading and writing is controlled by commands provided via the data I/O ports; and a controller arranged for controlling the read and write operation of each of the semiconductor memory devices, wherein when the controller is supplied with a command, a receiver address, a sender address, and an amount of data, the data can be transferred from one of the semiconductor memory devices to another within this system.

7. A semiconductor memory system having a set of semiconductor memory devices of which the read and write operations can be controlled by commands received from an external CPU, comprising:

a semiconductor memory device having a chip select signal input, an output enable signal input, a write enable signal input, address inputs and data I/O ports, and arranged so that data reading and writing at high speeds is performed through the interface of the buses connected to the address inputs and the data I/O ports;

a semiconductor memory device having a chip select signal input, an output enable signal input, a write enable signal input, address inputs and data I/O ports, and arranged so that data reading and writing is controlled by commands provided via the data I/O ports; and a controller arranged for controlling the read and write operation of each of the semiconductor memory devices, wherein when a data is read out from any of the semiconductor memory devices, it is written into a desired address of another semiconductor memory device and simultaneously dispatched from the controller to the outside.

8. A semiconductor memory system having a set of semiconductor memory devices of which the read and write operations can be controlled by commands received from an external CPU, comprising:

a volatile semiconductor memory device having a chip select signal input, an output enable signal input, a write enable signal input, address inputs and data I/O ports, and arranged so that data reading and writing at high speeds is performed through the interface of the buses connected to the address inputs and the data I/O ports;

a nonvolatile semiconductor memory device having a chip select signal input, an output enable signal input, a write enable signal input, address inputs and data I/O ports, and arranged so that data reading and writing is controlled by commands provided via the data I/O ports; and a controller arranged for controlling the read and write operation of each of the semiconductor memory devices, wherein a data read from a part or the entire area of the volatile semiconductor memory device is written at intervals of a particular time by the controller into the nonvolatile semiconductor memory device.

9. A semiconductor memory system having a set of semiconductor memory devices of which the read and write operations can be controlled by commands received from an external CPU, comprising:

a volatile semiconductor memory device having a chip select signal input, an output enable signal input, a write enable signal input, address inputs and data I/O ports, and arranged so that data reading and writing at high speeds is performed through the interface of the buses connected to the address inputs and the data I/O ports;

a nonvolatile semiconductor memory device having a chip select signal input, an output enable signal input, a write enable signal input, address inputs and data I/O ports, and arranged so that data reading and writing is controlled by commands provided via the data I/O ports; and a controller arranged for controlling the read and write operation of each of the semiconductor memory devices, wherein the controller upon receiving a command from the CPU compares a data read out from a part or the entire area of the volatile semiconductor device with a data read out from a part or the entire area of the nonvolatile semiconductor device and only when finds that the data from the volatile semiconductor memory device is different, can write the data into the nonvolatile semiconductor memory device.

10. A semiconductor memory system having a set of semiconductor memory devices of which the read and write operations can be controlled by commands received from an external CPU, comprising:

a volatile semiconductor memory device having a chip select signal input, an output enable signal input, a write enable signal input, address inputs and data I/O ports, and arranged so that data reading and writing at high speeds is performed through the interface of the buses connected to the address inputs and the data I/O ports;

a nonvolatile semiconductor memory device having a chip select signal input, an output enable signal input, a write enable signal input, address inputs and data I/O ports, and arranged so that data reading and writing is controlled by commands provided via the data I/O ports; and a controller arranged for controlling the read and write operation of each of the semiconductor memory devices, wherein the memory area of the volatile semiconductor memory device is divided into segments which are then assigned with updating flags and when a segment is updated, its updating flag is set up allowing the controller to read a data from the segment in the volatile semiconductor memory device and write the same data into the nonvolatile semiconductor memory device.

* * * * *

UNITED STATES PATENT AND TRADEMARK OFFICE
CERTIFICATE OF CORRECTION

PATENT NO.     : 6,549,469 B2
DATED          : April 15, 2003
INVENTOR(S)    : Hidenobu Gochi It is certified that error appears in the above-identified patent and that said Letters Patent is hereby corrected as shown below:

<u>Title page,</u>
Item [30], Foreign Application Priority Data, change "July 11, 2001" to
-- November 7, 2001 --

Signed and Sealed this

Thirty-first Day of August, 2004

JON W. DUDAS
*Director of the United States Patent and Trademark Office*